US010956724B1

(12) United States Patent
Terrano

(10) Patent No.: US 10,956,724 B1
(45) Date of Patent: Mar. 23, 2021

(54) UTILIZING A HYBRID MODEL TO RECOGNIZE FAST AND PRECISE HAND INPUTS IN A VIRTUAL ENVIRONMENT

(71) Applicant: Facebook Technologies, LLC, Menlo Park, CA (US)

(72) Inventor: Mark Terrano, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/566,461

(22) Filed: Sep. 10, 2019

(51) Int. Cl.
*G06K 9/00* (2006.01)
*G06N 20/00* (2019.01)
*G06T 17/05* (2011.01)
*G06T 19/00* (2011.01)
*G06N 3/04* (2006.01)

(52) U.S. Cl.
CPC ..... *G06K 9/00355* (2013.01); *G06K 9/00362* (2013.01); *G06N 3/049* (2013.01); *G06N 20/00* (2019.01); *G06T 17/05* (2013.01); *G06T 19/006* (2013.01)

(58) Field of Classification Search
None
See application file for complete search history.

(56) References Cited

U.S. PATENT DOCUMENTS

| 10,304,208 | B1* | 5/2019 | Chandler | G06K 9/00248 |
|---|---|---|---|---|
| 2013/0279756 | A1* | 10/2013 | Menadeva | G06K 9/00389 382/103 |
| 2015/0104106 | A1* | 4/2015 | Elinas | G06K 9/48 382/201 |
| 2017/0213112 | A1* | 7/2017 | Sachs | G06T 7/90 |
| 2018/0260964 | A1* | 9/2018 | Zhao | G06T 7/254 |
| 2019/0129607 | A1* | 5/2019 | Saurabh | G06F 3/0304 |

OTHER PUBLICATIONS

Javier Sanchez, Enric Meinhardt-Llopis, Gabriele Facciolo, TV-L1 Optical Flow Estimation, Image Processing On Line, 3 (2013) (https://www.ipol.im/pub/art/2013/26/article.pdf).
Wikipedia: The Free Encyclopedia; "Optical Flow," https://en.wikipedia.org/wiki/Optical_flow, downloaded Oct. 15, 2019.

\* cited by examiner

*Primary Examiner* — Brian M Butcher
(74) *Attorney, Agent, or Firm* — Keller Jolley Preece

(57) ABSTRACT

The present disclosure relates to systems, non-transitory computer-readable media, and methods for improving hand input detection in a virtual environment based on small and/or rapid hand inputs. For instance, a hybrid hand input detection system can utilize a hybrid hand input model that incorporates a machine-learning hand pose model with an optical flow network to recognize fine degrees of hand movement corresponding to input commands within a virtual environment. In this manner, the hybrid hand input detection system can utilize a hybrid hand input model to recognize small and rapid hand inputs in virtual reality or augmented reality without requiring a physical input device.

20 Claims, 16 Drawing Sheets

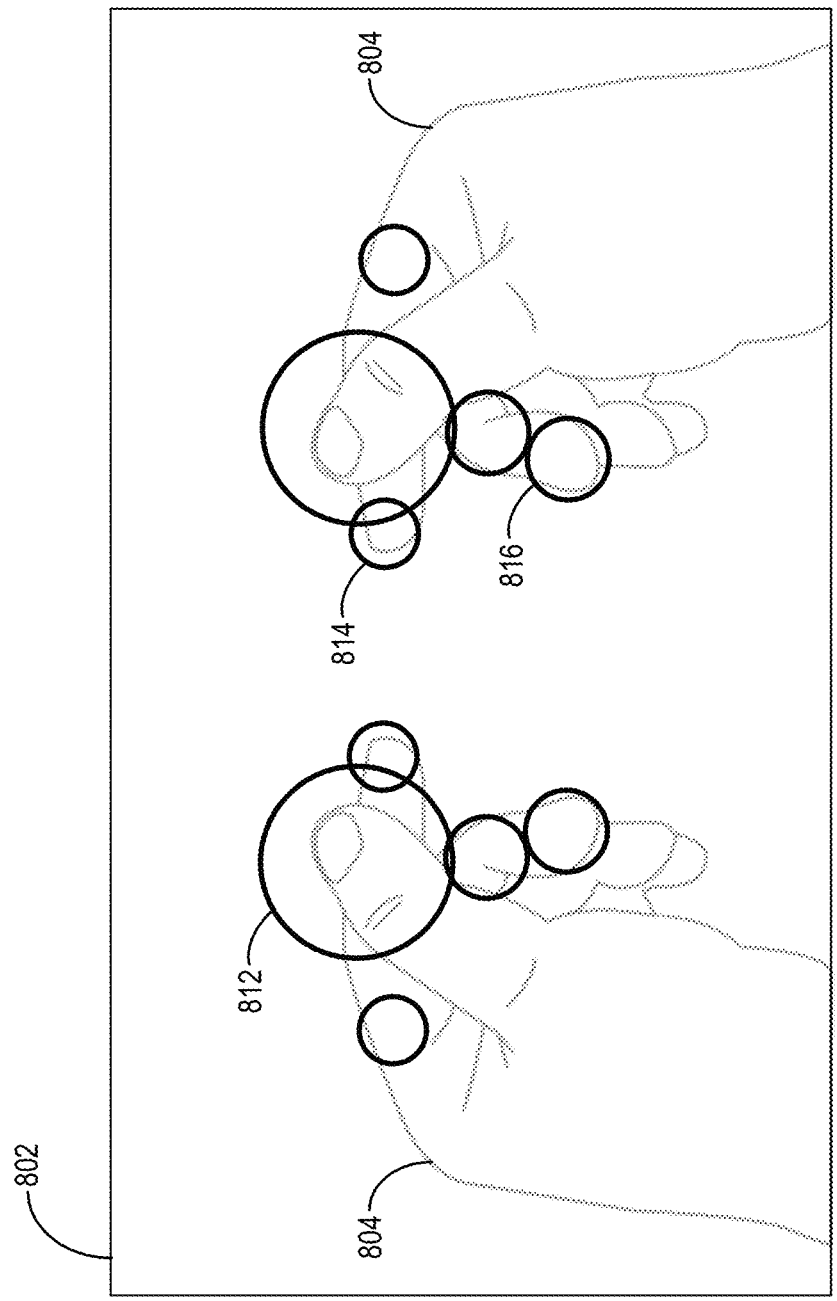

UTILIZING A HYBRID MODEL TO RECOGNIZE FAST AND PRECISE HAND INPUTS IN A VIRTUAL ENVIRONMENT

BACKGROUND

Recent years have seen significant technological improvements in hardware and software platforms for engaging in virtual environments (e.g., virtual reality and augmented reality). Indeed, computing devices that enable users to immerse themselves in virtual environments are becoming smaller and more portable. Further, software advances are enabling increasingly sophisticated and lifelike experiences with respect to virtual environments.

Despite these advancements, conventional virtual reality systems have a number of problems in relation to accuracy, efficiency, and flexibility of operations in the areas of recognizing hand input controls within a virtual environment. For instance, conventional systems suffer from a number of drawbacks in detecting user inputs in a virtual environment without the assistance of a physical device. More particularly, conventional systems often fail to detect small or quick hand inputs provided in a virtual environment when the user is not using a physical input device, such as a controller or a remote.

As mentioned above, conventional systems struggle with accurately detecting hand inputs that include discrete hand and finger movements, such as hand inputs common to gaming and text entry. For instance, many conventional systems can detect large and distinct hand movements within a virtual environment; however, these conventional systems struggle to accurately detect small, fast, and precise hand inputs. Rather, these conventional systems miss small and discrete hand movements such as button taps or keystrokes.

As a further issue with accuracy, the variation of human hands (e.g., size, shape, resting position, and proportions) further cause conventional systems to inaccurately detect hand and finger inputs. Indeed, the variation among human hands compounds the accuracy problem and adds to the challenge of making generalized models that isolate fine degrees of movement for hand input recognition. In addition, conventional systems also perform poorly with respect to accuracy in low light conditions Regarding the efficiency of operation, some conventional systems employ image processing approaches to detect discrete hand and finger movements representing a hand input. However, image processing commonly requires larger amounts of computational resources. Indeed, to detect movement of a finger from one frame to the next often requires a pixel-to-pixel analysis of every pixel from the two images.

In addition, the processing requirements further compound when pixels drastically change from one frame to the next, such as when the user is moving within the virtual environment causing everything in the virtual environment to move, which increases the complexity in detecting small or rapid hand movements representing inputs. Moreover, conventional systems are inefficient due to processing latency and delays. For instance, a full gesture pipeline can introduce too much processing latency to allow for precision detection. In particular, by the time the conventional systems have processed a hand input, the processed user input is too late, and the user is left waiting for the input to be executed.

Conventional systems are also inflexible. For instance, many conventional systems employ a rigid model that is suited for a particular type of hand input. While some conventional systems are trained to recognize a small number of hand poses within small a tolerance of variation, variations in hand types can cause these conventional systems to fail to detect hand poses, let alone discrete movements with respect to the hand poses.

These, along with additional problems and issues, exist with regard to conventional hand gesture detection systems.

SUMMARY

Embodiments of the present disclosure provide benefits and/or solve one or more of the foregoing or other problems with systems, non-transitory computer-readable media, and methods for improving hand input detection in a virtual environment based on small and/or rapid hand inputs. In particular, the disclosed systems can utilize a hybrid hand input model to recognize slight and/or rapid hand inputs in virtual reality (or augmented reality) without requiring a physical input device. For example, the disclosed systems utilize a machine-learning hand pose model combined with an optical flow model to efficiently recognize the hand inputs.

To illustrate, in one or more embodiments, the disclosed systems utilize a machine-learning hand pose model to determine a pose of a hand within an image in a virtual environment. Based on the hand pose, the disclosed systems can detect one or more segmented areas (e.g., finger tip(s)) within the image and one or more subsequent images. The disclosed systems can utilize an optical flow model to generate an optical flow vector for each of the segmented areas based on pixel movements from the image to the one or more subsequent images. Utilizing the optical flow vectors, the disclosed systems can determine an input command based on the optical flow vector and execute the input command.

Additional features and advantages of one or more embodiments of the present disclosure are provided in the description which follows, and in part will be apparent from the description, or may be learned by the practice of such example embodiments.

BRIEF DESCRIPTION OF THE DRAWINGS

The detailed description provides one or more embodiments with additional detail through the use of the accompanying drawings, as briefly described below.

FIGS. 8A-8C illustrate example diagrams of detecting user hand inputs with respect to a virtual game controller in accordance with one or more embodiments.

DETAILED DESCRIPTION

Figure 1:
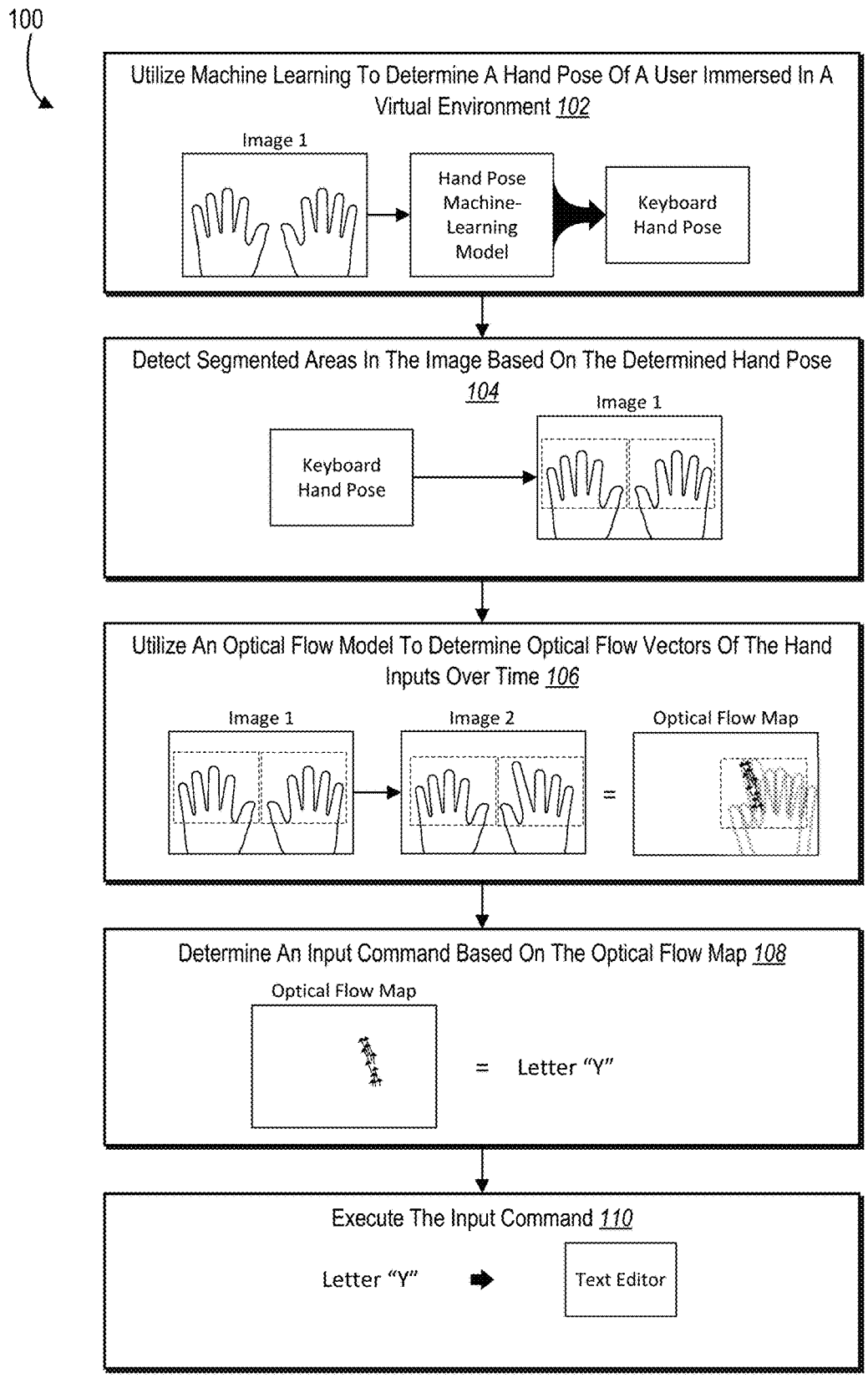
FIG. 1 illustrates a diagram of an overview of utilizing a hybrid hand input detection system to recognize fast and precise hand inputs in a virtual environment in accordance with one or more embodiments.

One or more embodiments of the present disclosure include a hybrid hand input detection system that enables recognition of small and fast hand inputs within a virtual environment. For instance, the hybrid hand input detection system (or simply "hybrid detection system") can utilize a machine-learning hand pose model in connection with an optical flow network to recognize fine degrees of hand movement corresponding to input commands within a virtual environment.

To illustrate, in one or more embodiments, the hybrid detection system utilizes the machine-learning hand pose model to determine a pose of a hand based on subsequent images captured of a user's hand while the user is immersed in a virtual environment. Upon identifying the hand pose, the hybrid detection system can detect one or more segmented areas associated with the hand pose (e.g., finger tips). In addition, utilizing the segmented areas in the images (e.g., a first image and one or more subsequent images) over time, the hybrid detection system can utilize the optical flow model to generate an optical flow vector indicating pixel movement within each of the segmented areas. Further, the hybrid detection system can determine an input command based on the optical flow vector and execute the input command (e.g., provide the input command directly or indirectly to the virtual environment).

As mentioned above, the hybrid detection system includes a machine-learning hand pose model and an optical flow model. In one or more embodiments, the machine-learning hand pose model estimates hand poses and identifies the areas within each hand pose to further process (e.g., the segmented areas). Next, the optical flow model processes pixel movement within the segmented areas to extract discrete movement information. In this manner, the hybrid detection system operates with a higher degree of accuracy than conventional machine-learning hand pose estimation systems and with significantly lower processing costs than conventional whole-image optical flow processing systems.

As also mentioned above, the hybrid detection system operates in connection with a virtual environment in which a user is immersed. For example, one or more cameras on a virtual reality device (e.g., a head-mounted display) capture real-time images of the user's hands in various hand poses and track the hand poses over time through the captured images. In some embodiments, the user's hands are shown within the virtual environment. In alternative embodiments, the hybrid detection system detects hand poses of the user without the user's hands appearing in the virtual environment.

In one or more embodiments, the hybrid detection system provides a virtual input device to the user before or after detecting a hand pose. For instance, the virtual environment is associated with a particular type of virtual input device, such as a virtual gaming environment having a virtual game controller. Alternatively, the hybrid detection system can project different virtual input devices in response to detecting different hand poses of the user. For context, examples of virtual input devices include, but are not limited to, gaming controllers (e.g., single or dual handgrip), keyboards (e.g., qwerty or texting), buttons, sliders, wands, joysticks, and pointers. Further, in some embodiments, the hybrid detection system can reconfigure and/or remap a virtual input device to fit a user's hand, irrespective of the user's hand size, shape, or type.

As mentioned above, the hybrid detection system can utilize a machine-learning hand pose model. In various embodiments, the machine-learning hand pose model estimates or predicts a hand pose of the user. For example, the machine-learning hand pose model determines a hand pose from multiple hand poses that are possible based on analyzing key points of the hands and the given virtual environment.

In one or more embodiments, the machine-learning hand pose model can detect segmented areas based on the identified hand pose. For instance, upon identifying a hand pose, the machine-learning hand pose model can determine one or more segmented areas of the hand pose to focus on for additional processing. In some embodiments, the segmented areas of the hand pose are predetermined based on the corresponding hand pose.

Further, the hybrid detection system can determine when the user switches to another hand pose. For instance, the hybrid detection system detects a threshold amount of movement within a segmented area between images. Based on this detection, the hybrid detection system can instruct the machine-learning hand pose model to determine whether a new hand pose is present, and if so, identify new segmented areas.

As also mentioned above, the hybrid detection system can utilize an optical flow model. In one or more embodiments, the optical flow model processes the segmented areas. Indeed, contrary to conventional systems that process whole images, the optical flow model analyzes and detects movement based on the segmented areas of the hand pose identified by the hybrid detection system, which can be significantly smaller than entire images. In various embodiments, the optical flow model analyzes pixel movement with a segmented area across images to generate optical flow vectors, as further described below. In addition, the optical flow model can combine one or more optical flow vectors to generate a vector map (i.e., an optical flow map).

In some embodiments, the hybrid detection system utilizes an environmental optical flow or an anchor point to normalize an optical flow vector and/or optical flow map. For example, the hybrid detection system generates an environmental optical flow based on a control segmented area and/or from information provided by the virtual reality device. Then, the hybrid detection system can apply the environmental optical flow to the optical flow map to isolate hand movements from other movement data (e.g., head movement). In some embodiments, the hybrid detection system can utilize an anchor point to normalize the optical flow map and isolate hand movements for other movement data in the optical flow map.

In one or more embodiments, the optical flow model can determine an input command based on the optical flow map. For instance, the optical flow model determines which input on the virtual input device the user is selecting based on detecting pixel movement in the optical flow map. For example, the optical flow model can determine if the optical flow vectors on the optical flow map align with one of the recognized input commands associated with the hand pose. Further, by analyzing the start, stop (e.g., sudden stops), and direction reversal points in the optical flow map, the optical flow model can determine an input command selected by the user.

As explained above, the digital transcription system provides numerous advantages, benefits, and practical applications over conventional systems and methods. For instance, the hybrid detection system enables recognition of fast and precise hand inputs in a virtual environment without requiring a physical input device. Indeed, the synergy of the machine-learning hand pose model and the optical flow model enable the hybrid detection system to detect a user's hand movements with high precision and low computational costs. In particular, the hybrid detection system provides advantages over conventional systems with respect to accuracy, efficiency, and flexibility.

With respect to the accuracy of operation, the hybrid detection system can accurately detect swift and subtle hand movements at high levels of precision. Indeed, the hybrid detection system can accurately match the fast timing of user inputs (e.g., repeated button pushes or fast keystrokes) as well as maintain a high level of precision with respect small, discrete hand movements by using an optical flow model rather than generic hand pose estimations to recognize hand movements.

As another example of improved accuracy, the hybrid detection system can account for perspective changes in the virtual environment. For example, based on monitoring movement in segments outside of the hand pose, the hybrid detection system can determine when a user is changing their view of the virtual environment (e.g., the user is moving their head) and negate those movements with respect to the discrete movements, which maintains the high level of precision and accuracy.

In addition, the hybrid detection system can accurately operate across a variety of hand shapes, sizes, and types, as mentioned previously. For example, the hybrid detection system can correctly detect hand poses for users having different hand types as well as accurately detect corresponding segmented areas. Further, the hybrid detection system can better identify an accurate range of user-to-hand relationship, which reduces the need to re-process the user's hands through the pose estimation machine learning model. Moreover, the hybrid detection system can accurately operate in low-light situations. Indeed, the hybrid detection system utilizes the optical flow model to gain accuracy improvements in low light situations over machine-learning hand pose estimation models.

Regarding the efficiency, the hybrid detection system significantly lowers computational costs by limiting processing to select segmented areas rather than processing full images. Indeed, by reducing the size of images (e.g., processing segmented areas), the hybrid detection system reduces processing time (i.e., improves speed) needed to calculate solutions as well as reduces the CPU/GPU computation power needed to process those solutions. Further, if a virtual reality device is performing optical flow for another task, adding the disclosed optical flow model and performing optical flow segmentation in input images will add minimal additional processing costs to the virtual reality device overall.

Notably, the reduction in computational costs and time enables the hybrid detection system to operate in real time or near real time. For example, the hybrid detection system can detect, recognize, and apply user inputs in line with the user's hand movements. Indeed, the hybrid detection system reduces the processing time, enabling hand input detection to be practical in speed-demanding virtual environments. Further, when the hybrid detection system is implemented on a battery-operated device, the reduced number of computations can result in power savings, lower heat diffusion, and longer battery life.

Additionally, the hybrid detection system provides flexibility of operation over conventional systems. As mentioned above, the hybrid detection system can be utilized with users having a variety of hand shapes, sizes, and types. Further, the hybrid detection system can adapt based on user customizations and preferences. For example, the hybrid detection system can remap a virtual input device to perfectly align with a user's hands and hand input preferences.

As illustrated by the foregoing discussion, the present disclosure utilizes a variety of terms to describe features and advantages of the hybrid detection system. Additional detail is now provided regarding these and other terms used herein. For example, as used herein, the terms "digital image" (or simply "image") refers to one or more to a digital graphics file that includes a stored visualization. In particular, an image includes a hand of a user. Often, an image is captured by a camera of a user's hands in a hand pose (e.g., while the user is engaged in a virtual environment). In addition, an image can be part of a sequence of images, such as image frames in a video and/or a first image and one or more subsequent images, where the sequence of images shows a user's hand movements captured at different times.

As used herein, the term "virtual environment" refers to a simulated environment in which users can fully or partially immerse themselves. For example, a virtual environment can comprise virtual reality (including augmented reality). In general, a user participates in a virtual environment using a client device, such as a dedicated virtual reality device (e.g., a head-mounted display), a smartphone, or another computing device. A virtual environment can include objects and elements with which a user can interact. For example, the user can provide inputs to interact with items in a virtual game environment.

Also, as used herein, the term "hand input" refers to a user providing input in a virtual environment with or without manipulating a physical input device. In particular, the term hand input can refer to a hand or finger gesture or movement made by the user to indicate a desired action. A hand input can correspond to a physical input made on a physical input device (e.g., button press or key stroke) with or without the physical input device. In some embodiments, the user views a virtual input device in the virtual environment with which the user can interact as if it were the physical input device.

The term "hand pose," as used herein, refers to a position of a user's hands. In particular, the term hand pose refers to the position, orientation, and angle of a user's hands within an image. For example, a virtual reality headset includes one or more forward-facing camera that continuously captures the user's hand while the user is engaging with the virtual environment. In addition, the term "hand movement" refers to the movement of the user's hand while the user is engaging with the virtual environment. Hand movement can include changing between or in-and-out of hand poses. Hand movement can also include finger movements.

As used herein, the term "finger movement" refers to movements of fingers (including thumbs) within a hand pose. In particular, a finger movement can include small, fast, and/or precise movements of a user's fingers, joints, or fingertips. Finger movements can include, but are not limited to a tap, pinch, stretch, slide, roll, push, pull, press, scroll, swipe, or another detectable movement between images in a sequence of images.

As mentioned above, the hybrid detection system can employ machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a convolutional neural network), data-based models, or a combination of networks and models.

As used herein, the term "machine-learning hand pose model" refers to a machine-learning model that detects hand gestures and poses from one or more images. For example, in some embodiments, the machine-learning hand pose model learns to identify skeletal structure patterns, key points of a hand, hand features, and/or degrees of freedom that indicate a particular hand pose. In alternative embodiments, the machine-learning model is trained end-to-end to estimate hand poses based on input images. In one or more embodiments, the machine-learning hand pose model generates one or more segmented areas based on identifying a hand pose. Further, in various embodiments, the machine-learning hand pose model is a convolutional neural network.

The term, "segmented area" (or simply "segment") refers to a limited area of an image. In particular, a segmented area includes a subset of the pixels found in an image, which are analyzed for optical flow processing (e.g., an optical flow processing area). For example, if the image includes a target hand pose, the machine-learning hand pose model can generate a segmented area that corresponds to the left thumb (e.g., the last joint of the left thumb) of the user. In some instances, a segmented area captures multiple fingers. Indeed, segmented areas can be combined into larger areas or divided into smaller segmented areas. Also, a segmented area can be associated with one or more images in a series of images (e.g., the segment maintains its general location across multiple images). In any case, the segmented areas will still be smaller than the image as a whole—significantly smaller in most cases.

In some embodiments, the machine-learning hand pose model generates an object mask of each segmented area. As used herein, the terms "object mask," "segmentation mask," or "image mask" (or simply "mask") refer to an indication of a plurality of pixels within an image. In particular, the hybrid detection system can utilize an object mask to isolate the pixels in a segmented area from other pixels in an image. For example, the hybrid detection system generates an object mask to capture each fingertip within a sequence of images of a user's hands while the user is engaging with a virtual environment. An object mask can be square, circular, or another enclosed shape. In various embodiments, an image that is reduced in size based on applying an object mask is called a segmented image.

As mentioned herein, the hybrid detection system can utilize an optical flow model. The term "optical flow model," as used herein refers to a model that detects patterns of motion between a series of images. For instance, an optical flow model tracks pixel movement between a first image and one or more subsequent images. In some embodiments, the optical flow model utilizes a machine-learning model. In alternative embodiments, the optical flow model utilizes heuristic metrics. In additional, or alternative, embodiments, the optical flow model utilizes rules and calculations to detect motion between the images.

Furthermore, in various embodiments, the optical flow model generates one or more optical flow vectors. As used herein, the terms "optical flow vector" refers to a representation of pixel movements between two or more images. For instance, an optical flow vector indicates the movement of corresponding pixels from the first segmented image to one or more subsequent segmented images. One or more optical flow vectors can combine to form an optical flow vector map (also called an optical flow map or vector map). In particular, an optical flow map can include one or more optical flow vectors that show the direction and magnitude of pixel movements over time. In some embodiments, an optical flow map corresponds to a segmented area (e.g., a segmented image) rather than an entire image, which reduces processing costs.

Further, as described below, the hybrid detection system can utilize optical flow maps to detect an input command corresponding to the user's hand movement. As used herein, the term "input command" refers to a desired action communicated by the user to an input system. In particular, the term input command corresponds to input of an element of a virtual input device (e.g., keyboard or game controller). For example, each virtual input device can be associated with a list of valid inputs and invalid input commands. Examples of input commands include, but are not limited to a tap, pinch, stretch, slide, roll, push, pull, press, scroll, swipe, or another type of input command. Further, in some embodiments, the hybrid detection system can map optical flow maps to target input commands, as detailed below.

Additional detail will now be provided regarding the hybrid detection system in relation to illustrative figures portraying example embodiments and implementations of the hybrid detection system. For example, FIG. 1 illustrates an overview of the hybrid detection system (i.e., hybrid hand input detection system) detecting fast and precise hand inputs in a virtual environment in accordance with one or more embodiments. In particular, FIG. 1 includes a series of acts 100, which can be performed by the hybrid detection system in a number of embodiments.

As shown, the series of acts 100 includes an act 102 of the hybrid detection system utilizing machine learning to determine a hand pose of a user immersed in a virtual environment. For instance, in various embodiments, a virtual reality device (e.g., a head-mounted display) includes one or more cameras that capture images of a user's hands while the user is immersed in a virtual environment. In addition, the hybrid detection system can analyze images on the user's hands to identify a hand pose from a set of known hand poses (e.g., learned through training). As shown in connection with the act 102, the hybrid detection system determines that the image of the user's hands corresponds to a keyboard hand pose representing the user typing on a virtual full-size keyboard within the virtual environment. Additional detail regarding the hybrid detection system detecting hand poses is provided below in connection with FIG. 2A-2B.

The series of acts 100 also includes an act 104 of the hybrid detection system detecting segmented areas in the image based on the determined hand pose. In various embodiments, upon determining the hand pose in the image, the hybrid detection system identifies one or more segmented areas in the image. In particular, the hybrid detection system identifies areas of the image where small and discrete changes are likely to take place with respect to the user providing hand inputs or areas that will dictate an input command. Depending on the hand pose, a segmented area can be very small encompassing a single fingertip (e.g., corresponding to a remote control button) or larger encompassing multiple fingers (e.g., covering multiple keys on a keyboard).

As shown in the example implementation of FIG. 1, the hybrid detection system identifies two segmented areas around the user's hands based on the user's hands being in the keyboard hand pose. In alternative embodiments, the hybrid detection system can identify additional or different segmented areas. For example, the hybrid detection system detects ten segmented areas around the user's fingertips. In another example, the hybrid detection system detects a segmented area for each key corresponding to the virtual keyboard. Additional detail regarding the hybrid detection system detecting segmented areas is provided below in connection with FIG. 2B-3C.

As shown, the series of acts 100 includes an act 106 of the hybrid detection system utilizing an optical flow model to determine optical flow vectors of the hand input over time. In various embodiments, the hybrid detection system utilizes an optical flow model to track pixel movement within the segmented areas across a sequence of images of the user's hands (e.g., a first image and one or more subsequent images).

In addition, based on detecting pixel movements within a segmented area, the optical flow model can generate optical flow vectors for the segmented area that indicate how pixels move from a previous image to a current image. To illustrate, as shown in connection with the act 106 of FIG. 1, the hybrid detection system generates an optical flow map of the optical flow vectors showing pixel movement from a first image to subsequent images with respect to the left index finger of the user's right hand. Additional detail regarding the hybrid detection system utilizing the optical flow model is provided below in connection with FIG. 5A-6C.

FIG. 1 also shows the series of acts 100 including an act 108 of the hybrid detection system determining an input command based on the optical flow map. In one or more embodiments, the hybrid detection system compares the optical flow vectors within the optical flow map to known input commands and/or a virtual input device to determine an input command associated with the hand input of the user. As shown in connection with the act 108, the hybrid detection system determines that the optical flow map corresponds to the user typing the letter "y" on a virtual keyboard. Additional detail regarding the hybrid detection system detecting an input command is provided below in connection with FIG. 7.

As shown, the series of acts 100 also includes the act 110 of the hybrid detection system executing the input command. In some embodiments, executing the input command includes providing the input command to the virtual environment. For example, if the virtual environment includes a text editor, the hybrid detection system provides the input command (i.e., the letter "y") to the text editor, as shown in connection with the act 110.

In alternative embodiments, executing the input command corresponds to sending the command to a remote computing device that is associated with the virtual environment. For example, in various embodiments, the virtual environment is implemented by a separate device, such as a connected server device providing virtual reality content to a local client device (e.g., the virtual reality device), which displays the virtual reality content.

As mentioned above, the hybrid detection system can utilize a hybrid hand input model to recognize small and rapid hand inputs in virtual reality or augmented reality without requiring a physical input device. While a physical input device is not required, in some embodiments, the hybrid detection system can accurately recognize hand inputs with respect to a physical input device. In this manner, users can enjoy the tactile feel of a physical device while also taking advantage of the benefits of the hybrid detection system, as described herein. Further, users can utilize the same physical input device (e.g., game controller) across different AR/VR platforms and systems (e.g., gaming systems), even if the physical input device is otherwise incompatible (e.g., using System A's controller to operate Systems A, B, and C). Accordingly, while the following disclosure is described in terms of detecting physical hand inputs without a physical input device, similar principals, techniques, systems, and methods as disclosed herein can be utilized to detect physical hand inputs with respect to a physical input device.

To illustrate, the hybrid detection system can recognize user hand inputs on a non-functional controller, such as a model controller or a controller that is powered off. Indeed, the hybrid detection system can utilize the hybrid hand input model detect the hand movement of the user and/or the physical manipulation of the physical input device based on the systems and methods detailed below. In additional embodiments, the hybrid detection system can provide supplemental inputs based on hand input with a physical input device. For example, when a user provides hand input to an element on a physical input device (e.g., a button on a functioning remote), the remote can execute the command in response to the element being activated. Additionally, the hybrid detection system can utilize the hybrid hand input model to visually detect the hand input and execute an additional (or replacement) input command.

Figure 2:
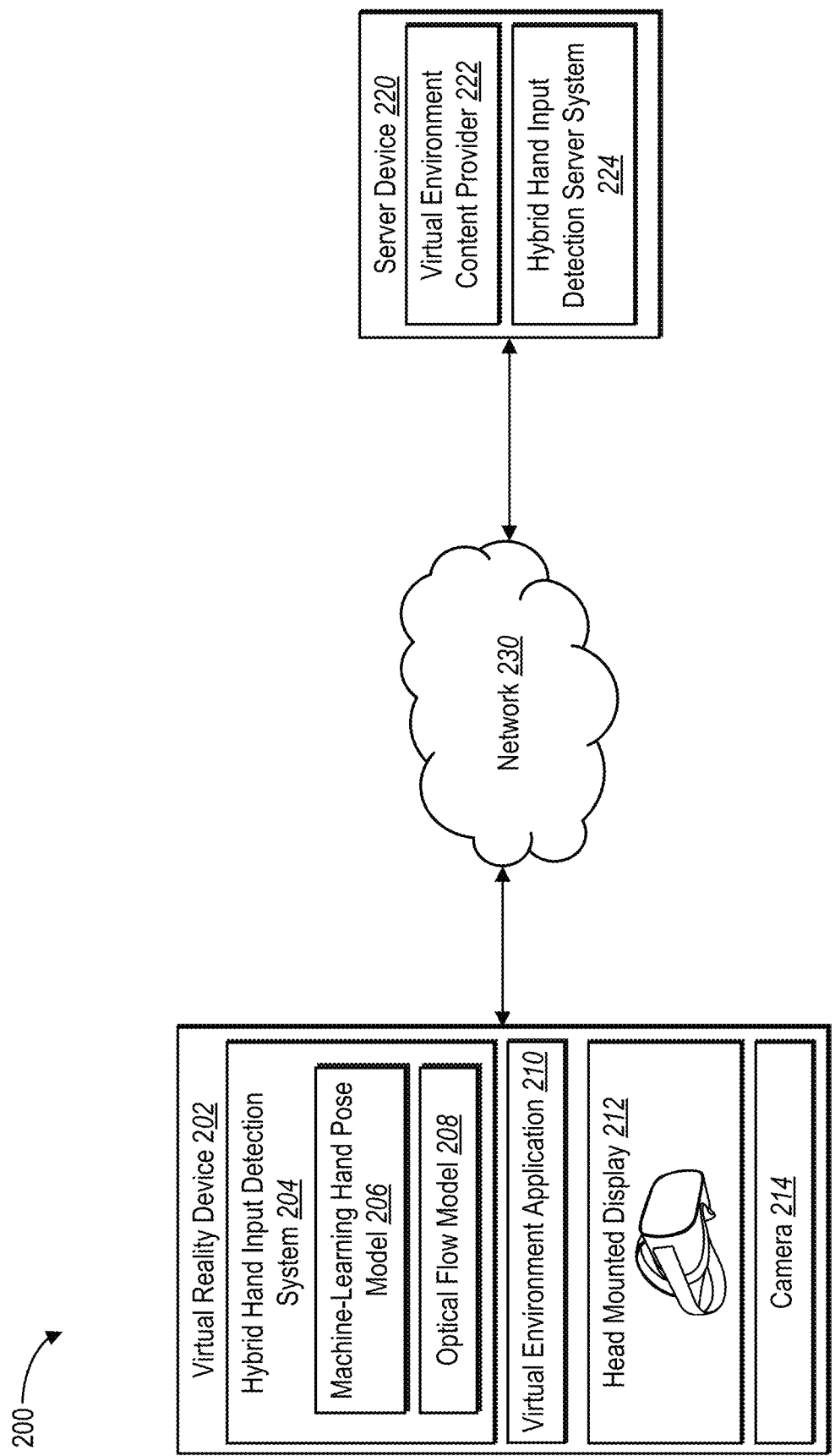
FIG. 2 illustrates a schematic diagram of an environment in which a hybrid hand input detection system can operate in accordance with one or more embodiments.

FIG. 2 illustrates a schematic diagram of an example environment 200 in which a hybrid hand input detection system 204 (or simply "hybrid detection system 204") can operate in accordance with one or more embodiments. As shown, the environment 200 includes a virtual reality device 202 hosting the hybrid detection system 204. In many embodiments, the virtual reality device 202 is a client device associated with the user that facilitates providing virtual reality content (including augmented reality content) for a user by simulating a virtual environment. In some embodiments, the virtual reality device 202 is a portable virtual client device (e.g., a headset or a smartphone). In alternative embodiments, the virtual reality device 202 is a client device, such as a desktop, laptop, or other type of computing device that includes a headset peripheral component to provide virtual reality content.

In addition, the virtual reality device 202 includes a virtual environment application 210, a head-mounted display 212, and a camera 214. As shown, in some embodiments, the virtual environment application 210 is separate from the hybrid detection system 204. In alternative embodiments, the virtual environment application 210 hosts the hybrid detection system 204.

In various embodiments, the virtual environment application 210 provides virtual reality content to a user. For example, the virtual reality content can be downloaded on the virtual reality device 202 and/or streamed from a remote source. The virtual environment application 210 can provide the user with one or more virtual input devices based on the content and context of the virtual environment. For example, if the virtual environment application 210 is hosting a game, the virtual environment application 210 can provide the user with a virtual game controller that the user "holds" in their hands.

The head-mounted display 212 can correspond to hardware and/or software components of the virtual reality device 202. For example, the head-mounted display 212 includes head mounting hardware, display hardware, and audio hardware. Further, in many embodiments, the head-mounted display 212 can implement the other components of the virtual reality device 202. In alternative embodiments, the head-mounted display 212 is located as a separate peripheral device located apart from one or more other components of the virtual reality device 202.

The virtual reality device 202 can also include the camera 214, which can represent one or more cameras). For example, in the case of a head-mounted display, the virtual reality device 202 can include a depth camera (e.g., an infrared camera), an RGB camera, and/or another type of camera. Further, the virtual reality device 202 can include multiple cameras, either of the same type, or of different types. As mentioned above, the camera 214 can capture images of a user's hands as they are engaged in a virtual environment.

As shown, the hybrid detection system 204 includes a machine-learning hand pose model 206 and an optical flow model 208. As mentioned above, the hybrid detection system 204 utilizes the machine-learning hand pose model 206 to generally detect hand poses and segmented areas. The hybrid detection system 204 can utilize the optical flow model 208 to generate optical flow vectors and recognize input commands. Additional detail regarding the machine-learning hand pose model 206 and the optical flow model 208 is provided in connection with the subsequent figures.

As also shown, the environment 200 can also include a server device 220 connected to the virtual reality device 202 via a network 230. Examples of computing devices (e.g., the virtual reality device 202 and the server device 220) as well as of networks (e.g., the network 230), along with additional corresponding details, are provided below with respect to FIG. 12.

As shown, the server device 220 includes a virtual environment content provider 222 and a hybrid hand input detection server system 224. In various embodiments, the virtual environment content provider 222 provides virtual content to the virtual reality device 202 (e.g., the virtual environment application 210). For example, the virtual environment content provider 222 sends programs, games, applications and/or software to the virtual reality device 202 for the virtual environment application 210 to show to a user via the head-mounted display 212. In some instances, the virtual environment content provider 222 streams virtual content to the virtual reality device 202.

In one or more embodiments, the hybrid hand input detection server system 224 provides a version of the hybrid detection system 204 to the virtual reality device 202. In some embodiments, the hybrid hand input detection server system 224 provides updates to the hybrid detection system 204. For example, the hybrid hand input detection server system 224 trains and updates the machine-learning hand pose model 206 offline and provides it to the virtual reality device 202 such that the hybrid detection system 204 can apply the machine-learning hand pose model 206. Similarly, the hybrid hand input detection server system 224 can provide and update the optical flow model 208 to the hybrid detection system 204 on the virtual reality device 202.

In other embodiments, the hybrid detection system 204 is implemented by both the virtual reality device 202 and the server device 220. Indeed, in one or more embodiments, the virtual reality device 202 can implement all or a portion of the hybrid detection system 204. In alternative embodiments, the hybrid detection system 204 is located and implemented primarily on the server device 220 with images and/or hand inputs being send by the virtual reality device 202 to the hybrid detection system 204 located on the server device 220. In some embodiments, the hybrid detection system 204 and the hybrid hand input detection server system 224 are part of the same system.

In some embodiments, the hybrid detection system 204 operates without being connected to the server device 220. For instance, the hybrid detection system 204 on the virtual reality device 202 is self-sufficient to recognize hand inputs of a user. For example, the virtual reality device 202 utilizes virtual environment content stored in memory to provide a user with an immersive virtual environment experience.

Although FIG. 2 illustrates a particular arrangement of the virtual reality device 202, the server device 220, and the network 230, various additional arrangements are possible. For example, the virtual reality device 202 may directly communicate with the server device 220, bypassing the network 230. Similarly, although the environment 200 of FIG. 2 is depicted as having various components, the environment 200 may have additional or alternative components. For example, the server device 220 includes multiple server devices. As another example, the virtual reality device 202 can directly communicate with peripheral devices (e.g., a connected virtual reality headset).

Figure 3A:
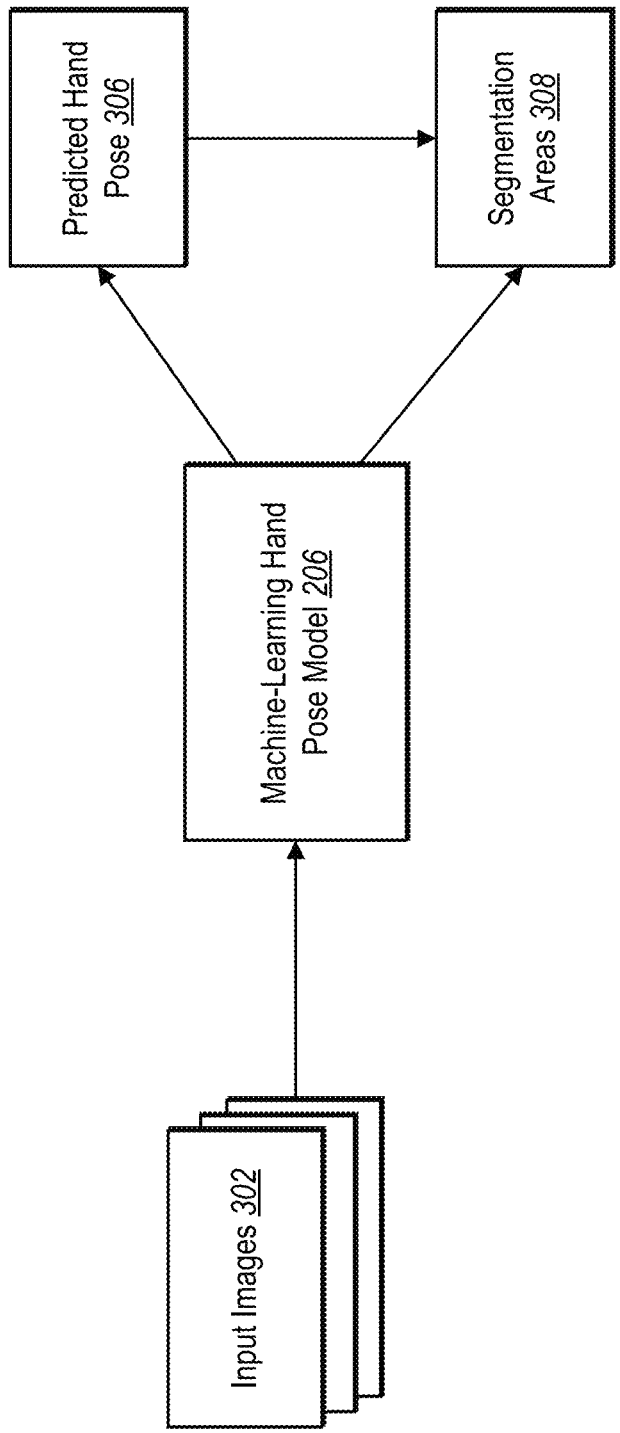
FIGS. 3A-3B illustrate schematic diagrams of a machine-learning hand pose model pipeline in accordance with one or more embodiments.
Figure 3B:
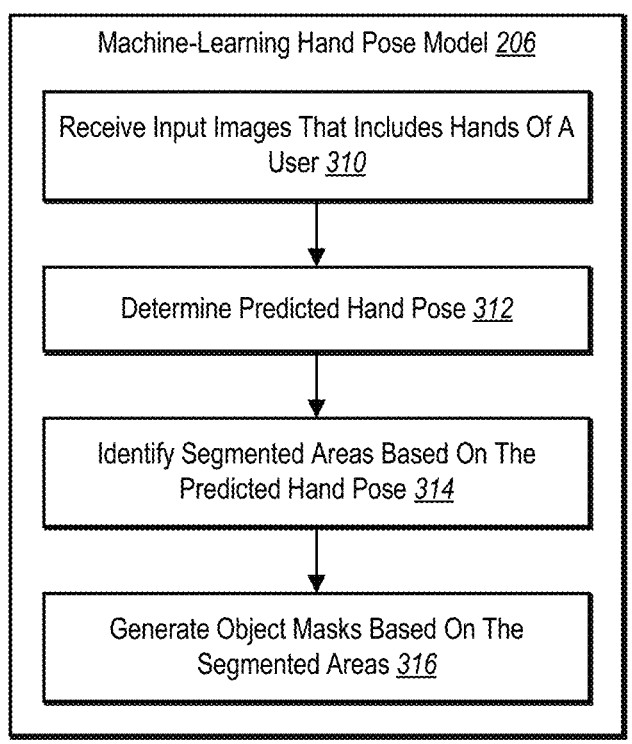
Figure 4C:
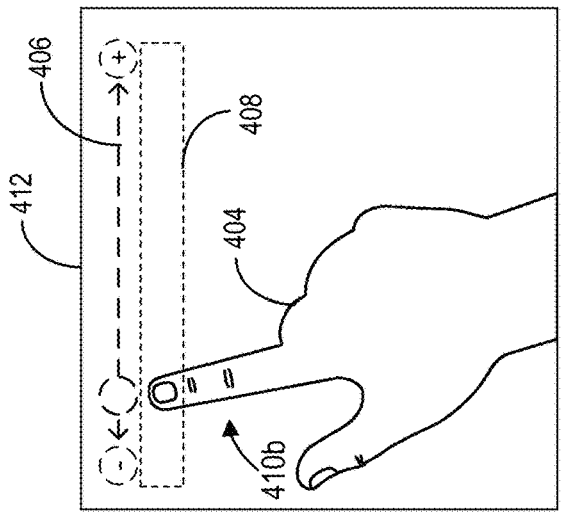
FIGS. 4A-4C illustrate an overview of a process of determining a segmented area in a sequence of images based on the machine-learning hand pose model in accordance with one or more embodiments.

Turning now to FIGS. 3A-4C, additional detail is provided regarding the hybrid detection system 204 utilizing the machine-learning hand pose model 206. In particular, FIGS. 3A-3B correspond to training and utilizing the machine-learning hand pose model 206 to determine hand poses and segmented areas. FIGS. 4A-4C provide illustrative examples of detecting a segmented area based on a detected hand pose.

In particular, FIGS. 3A-3B illustrate schematic diagrams of the machine-learning hand pose model 206 pipeline in accordance with one or more embodiments. As shown in FIG. 3A, the hybrid detection system 204 applies the machine-learning hand pose model 206 to input images 302 and predicts a hand pose (i.e., the predicted hand pose 306). In addition, the machine-learning hand pose model 206 can determine segmented areas 308 based on the predicted hand pose 306.

In various embodiments, the input images 302 correspond to images captured of a user's hands while the user is engaging in a virtual environment on the virtual reality device. For example, a camera on the virtual reality device (or another camera) captures a sequence of images (e.g., a first image and one or more subsequent images) of the user's hands while they engage in the virtual environment. In some embodiments, the input images 302 are only a few milliseconds apart (e.g., 5-10 milliseconds) to ensure that all hand inputs are detected and processed, no matter how small or discrete.

As mentioned above, the hybrid detection system 204 can train the machine-learning hand pose model 206 or otherwise obtain a trained machine-learning hand pose model 206 (e.g., from the hybrid hand input detection server system 224). In various embodiments, the hybrid detection system 204 is trained in a supervised manner by teaching the hybrid detection system 204 to correctly classify various hand poses. For example, the hybrid detection system 204 provides training data to the machine-learning hand pose model 206 that includes various images of hand poses across users have different sizes, shapes, and types of hands. The hybrid detection system 204 trains to machine-learning hand pose model 206 to accurately classify and predict a hand pose from one or more of the input images 302.

In some embodiments, the hybrid detection system 204 trains the hybrid detection system 204 as an convolutional neural network to classify a hand pose (e.g., the predicted hand pose 306) based on identifying key points and/or hand features on the hand (e.g., joints, fingertips, knuckles, fingernails, and/or muscles) as well as comparing feature values of the skeletal structure and/or key points in multidimensional vector space to known key points to determine the closest matching hand pose. In some embodiments, the hybrid detection system 204 compares the skeletal structure identified in the input images 302 to learned skeletal structure patterns. In alternative embodiments, the hybrid detection system 204 trains the machine-learning hand pose model 206 in an end-to-end manner (e.g., using a SoftMax classifier) to predict the most likely hand pose for a given input image In one or more embodiments, the hybrid detection system 204 trains the machine-learning hand pose model 206 to determine the pose of a hand by generating a heat map (e.g., a thermal image) of one or more of the input images 302. In various embodiments, a heat map can use color or another metric to represent warmth radiating from a user's hand. For instance, the heat map indicates locations of hand features and/or key points as learned by the machine-learning hand pose model 206. In addition, the machine-learning hand pose model 206 utilizes the locations of the hand features to identify one or more similar known hand poses having hand features in similar locations. More particularly, the machine-learning hand pose model 206 fits the locations of the hand features indicated by the heat maps to stored hand poses learned by the machine-learning hand pose model 206.

In various embodiments, the hybrid detection system 204 generates a three-dimensional representation of a hand. For example, the machine-learning hand pose model 206 is trained to generate a skeleton and mesh (including vertices) based on the input images 302. In some embodiments, the skeleton includes the hand features mentioned above. In additional embodiments, the machine-learning hand pose model 206 indicates the hand edges of the three-dimensional skeleton and mesh.

Further, the hybrid detection system 204 can associate one or more degrees of freedom (DOF) to define the range of motion of the hand pose. For example, each knuckle of a hand includes two degrees of freedom and each finger joint can include one degree of freedom. In some instances, degrees of freedom include rotational or translational degrees of freedom. Further, degrees of freedom can be associated with a range of values, such as a minimal value and a maximum value representing how much a joint can move along the degree of freedom and/or the orientation of each joint.

In additional embodiments, the hybrid detection system 204 can train the machine-learning hand pose model 206 to define a hand pose based on a set of values for each degree of freedom of the hand features. Indeed, different hand poses can be defined by different values for the degrees of freedom of the hand features. Accordingly, the hybrid detection system 204 can train the machine-learning hand pose model 206 to detect or predict a hand pose based on comparing degree of freedom values of the hand features of a potential hand pose to values for known hand poses.

Further, based on learning the skeleton, mesh, edges, and degrees of freedom for the hand, in some embodiments, the hybrid detection system 204 can also provide the three-dimensional rendering of the hand to the virtual environment. In additional embodiments, the machine-learning hand pose model 206 uses principal component analysis to predict the hand pose and/or render the hand into a three-dimensional rendering. With respect to detecting a hand pose and rendering a hand into a three-dimensional rendering, in some embodiments, the hybrid detection system 204 can utilize the techniques and approaches found in U.S. patent application Ser. No. 15/487,355, "Hand Calibration Using Least Squares Optimization," filed on Apr. 13, 2017, which is incorporated herein by reference in its entirety.

In some embodiments, the machine-learning hand pose model 206 is trained to recognize a large number of hand positions corresponding to a variety of virtual input devices. For example, the hybrid detection system 204 can detect a keyboard hand pose, a game controller hand pose, a button press hand pose, a finger scroll hand pose, a pin and zoom hand pose, or a remote control hand pose, among other hand poses. In this manner, the hybrid detection system 204 can generically utilize the same machine-learning hand pose model 206 across multiple unrelated virtual environments. In some embodiments, the machine-learning hand pose model 206 can also be trained to detect hand poses that do not correspond to a virtual input device (e.g., a closed first or an open hand).

In alternative embodiments, the machine-learning hand pose model 206 is tailored for a particular virtual environment. For example, in the case of a gaming virtual environment where the virtual input device is a dual handed game controller, the machine-learning hand pose model 206 is trained to determine whether or not the user's hands are in the controller hand pose. In these embodiments, the machine-learning hand pose model 206 can utilize a smaller memory footprint and more quickly determine when a user is activating the controller hand pose.

In some embodiments, the machine-learning hand pose model 206 filters (or weights) hand poses based on the virtual environment. For example, the machine-learning hand pose model 206 is trained to learn hand poses corresponding to different gaming controllers (e.g., a first controller with buttons on the left and a second controller with buttons on the right). However, if a client device provides a virtual environment that is associated with the second controller, the hybrid detection system 204 can filter out the predicted hand pose corresponding to the first controller (e.g., give the first controller hand pose zero weight) when applying the input images 302 to the machine-learning hand pose model 206.

As mentioned above, the machine-learning hand pose model 206 can generate a predicted hand pose 306. As previously described, the predicted hand pose 306 can be selected from a list of stored hand poses that are learned by the machine-learning hand pose model 206 during training. Further, the predicted hand pose 306 can be associated with one or more virtual input devices that are available within the virtual environment.

Also, the machine-learning hand pose model 206 can identify the segmented areas 308 for a hand pose. For example, in various embodiments, once the machine-learning hand pose model 206 generates the predicted hand pose 306, the machine-learning hand pose model 206 can identify portions or segmented areas 308 within the input images 302 focusing on the most important parts of the hand pose (portions of the hand pose where small and rapid movements are likely to occur).

In one or more embodiments, the machine-learning hand pose model 206 can access a database that predefines segmented areas of a hand pose. For example, based on predicting a texting keyboard hand pose, the machine-learning hand pose model 206 identifies (e.g., from information associated with the texting hand pose/two-finger keyboard) that the segmented areas correspond to the thumb tips (from the last joint to the tip of the thumb) within the image. Accordingly, the machine-learning hand pose model 206 can utilize the skeletal structure of the user's hands to identify the last thumb joint of each hand and apply segmented areas over the tips of the user's thumbs within each of the input images 302 that are in the predicted hand pose 306. In the case of a full keyboard hand pose, the machine-learning hand pose model 206 can identify segmented areas corresponding to all ten fingertips of the user's hands, segmented areas corresponding to each of the keyboard keys, and/or larger areas that cover multiple fingers (or multiple keyboard keys). Further, based on predicting a non-hand input hand pose (e.g., a fist or open palm), the machine-learning hand pose model 206 can determine that no segmented areas are needed until a different hand pose is detected.

In some embodiments, the hybrid detection system 204 and/or the machine-learning hand pose model 206 determines the locations of the segmented areas. In example embodiments, the machine-learning hand pose model 206 is further trained to generate segmented areas at the fingertips of the user's hands regardless of the predicted hand pose. In these embodiments, the machine-learning hand pose model 206 can generate segmented areas for any visible fingertip in the input images 302.

In some embodiments, a segmented area can range in size. For instance, in some embodiments, the size of a segmented area is based on the hand pose and/or the finger movement associated with the hand pose. For example, a trigger squeeze on a virtual input device can be detected with a smaller segmented area than a keyboard input where the user stretches their right pinky far across the keyboard to press the "delete" key. Indeed, the machine-learning hand pose model 206 can utilize a segmented area that accommodates large hand movements. Similarly, a thumb stick movement or a zooming action may require larger segmented areas to properly capture finger movements from one image to the next. Alternatively, a segmented area can be very small, such as covering a single button or key. In these instances, the machine-learning hand pose model 206 can establish a fingertip sized segmented area.

Moreover, the segmented areas 308 correspond to elements of a corresponding virtual input device. For example, for a game controller, each button, trigger, pad, or stick is associated with at least one segmented area. In some instances, a single segmented area can cover adjacent buttons or elements of the virtual input device.

In some embodiments, the machine-learning hand pose model 206 expands a segmented area based on the hand and/or finger movement of a user's hand. For example, the machine-learning hand pose model 206 can track a finger tip on the left hand and expand the segmented area around the fingertip as the finger moves in the subsequent input image 302. Further, in some embodiments, when a finger has not moved into an expanded part of a segmented area for a threshold period of time, the machine-learning hand pose model 206 can reduce the size of the segmented area. Likewise, the machine-learning hand pose model 206 can reset the size of a segmented area at set intervals.

In alternative embodiments, rather than expanding the size of a segmented area, the machine-learning hand pose model 206 utilizes a smaller sized segmented area (e.g., keeps segmented areas within a set size). In these embodiments, the machine-learning hand pose model 206 can track the hand and/or finger movement and move the segmented area in a corresponding manner. To illustrate, the machine-learning hand pose model 206 tracks finger movements of a target finger and updates the location of the segmented area to remain over the target finger. As the user's fingertip moves out of a segmented area, as described below, the machine-learning hand pose model 206 can generate a new segmented area with respect to subsequent images around the updated location of the fingertip. In this manner, while a segmented area may be created for a fingertip every few images, the machine-learning hand pose model 206 can maintain a small-sized segmented area.

The hybrid detection system 204 can also utilize the machine-learning hand pose model 206 to determine whether a user has changed the hand pose (e.g., from one hand pose to another) or is no longer making a hand pose. For instance, the machine-learning hand pose model 206 can periodically reevaluate the user's hand pose based on the incoming input images. For example, the machine-learning hand pose model 206 reevaluates the hand pose every x seconds (e.g., 0.5 seconds), every x images or frames (e.g., 10 frames), after x detected hand inputs (e.g., 5 button presses), or upon receiving a request for reevaluation of the hand pose. Further, in some embodiments, the machine-learning hand pose model 206 reevaluates the hand pose after an elapsed time since the last hand input (e.g., 1 second since the last recognized input command).

In some embodiments, the frequency of hand pose reevaluation is based on the hand pose itself. For example, a gaming controller hand pose is reevaluated less frequently than a wand/pointer hand pose or a non-hand input pose. By spacing out how often the machine-learning hand pose model 206 is applied to the input images 302, the hybrid detection system 204 can reduce processing costs and conserve power. Further, a new hand pose is detected, the machine-learning hand pose model 206 can determine new segmented areas, as described above.

With respect to determining when a hand pose changes, in a number of embodiments, the machine-learning hand pose model 206 utilizes hand pose anchor points to determine a change in a hand pose. For example, the machine-learning hand pose model 206 identifies a hand pose anchor point on the lower joints of the fingers, the palm, and/or the back of the hand. Further, the machine-learning hand pose model 206 can verify the location of the hand pose anchor points at set time intervals to determine whether the hand pose has changed. If the hand pose anchor points have changed beyond a threshold distance, the machine-learning hand pose model 206 can re-analyze the input images to determine the updated hand pose.

FIG. 3B provides additional detail regarding the machine-learning hand pose model 206 determining a predicted hand pose 306 and segmented areas 308 based on the input images 302. For example, FIG. 3B includes a series of actions that the hybrid detection system 204 can perform utilizing the machine-learning hand pose model 206 to identify a segmented area for an input image.

As shown in FIG. 3B, the machine-learning hand pose model 206 can perform an act 310 of receiving input images that includes hands of a user. As described above, in some embodiments, the input images (e.g., input images 302) are real-time images captured from one or more cameras associated with the virtual reality device while the user is being provided with a virtual environment experience. As explained previously, the input images can include a first image followed by one or more subsequent images. In one or more embodiments, the input images include a single hand. In alternative embodiments, the input images include both hands.

As shown, the machine-learning hand pose model 206 can perform an act 312 of determining a predicted hand pose 306. More specifically, as described above, the machine-learning hand pose model 206 can be applied to the input images to predict a hand pose using a variety of techniques and approaches. As detailed above, the machine-learning hand pose model 206 can be trained in a variety of ways (e.g., using different neural network schemes) to predict a hand pose from the input image. For example, the machine-learning hand pose model 206 utilizes skeletal structure pattern, key point, and/or degree of freedom comparisons to classify the hands in the input image as a specific hand pose.

Further, FIG. 3B shows that the machine-learning hand pose model 206 can perform an act 314 of identifying segmented areas based on the predicted hand pose. As described previously, the machine-learning hand pose model 206 can utilize various techniques and approaches to generate segmented areas within an image. For example, the machine-learning hand pose model 206 segments the predetermined areas of the hand pose (e.g., fingertips or joints) and/or generates segmented areas based on element locations of the corresponding virtual input device, as provided above.

In one or more embodiments, the machine-learning hand pose model 206 can perform an act 316 of generating object masks based on the segmented areas. By generating an object mask for each segmented area, the object masks can isolate pixels in a segmented area from other pixels in the input image. In essence, an object mask filters out all pixels in a full image not included in the segmented area, which effectively crops the image to a fraction of the original size, and creates a smaller segmented image of only the cropped segmented area.

Just as a segmented area can correspond to different shapes and sizes, likewise, an object mask can range in shape and size. In general, an object mask will share the same configuration as its corresponding segmented area. However, in some embodiments, an object mask may be smaller or larger than its corresponding segmented area. Further, an object mask can correspond to various shapes.

Figure 4B:
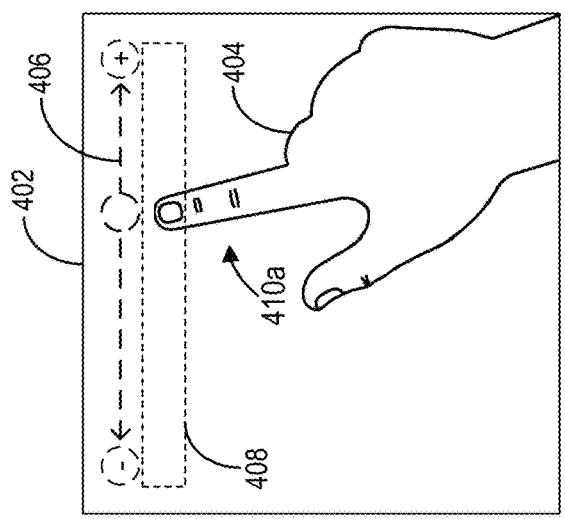
Figure 4A:
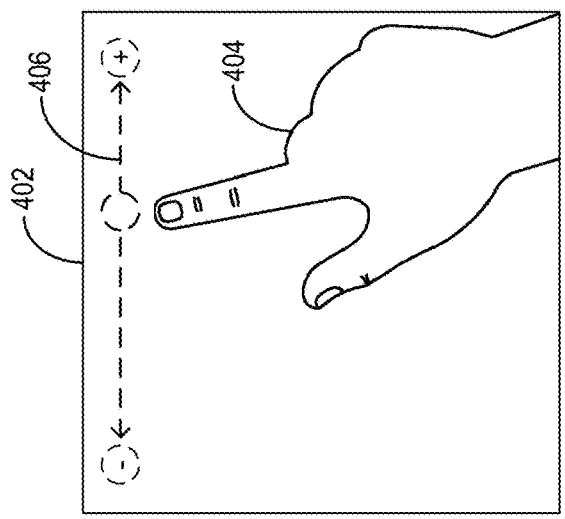

FIGS. 4A-4C shows determining a segmented area in images utilizing the machine-learning hand pose model 206 in accordance with one or more embodiments. As shown, FIG. 4A includes an image 402 (e.g., an input image) of a user's hand 404. For example, a front facing camera on a virtual reality device worn by the user captures the image 402, where the image 402 includes a hand 404 of the user.

For ease of explanation, the image 402 shows a virtual input device 406 (e.g., a sliding scale) in dashed lines. However, the virtual input device may not be included in the image 402 as the virtual input device 406 is shown within the virtual environment and the image 402 is a real-time capture of the user's hands in the real world. In some embodiments, however, the hybrid detection system 204 can overlay the virtual input device 406 onto the image 402.

As provided above, the hybrid detection system 204 can apply the machine-learning hand pose model 206 to the image 402 to predict a hand pose. For example, the machine-learning hand pose model 206 analyzes the image 402 (and possibly one or more subsequent images) to determine that the hand 404 is in a slider selection hand pose, where the user selects/modifies a slider preference with their index finger. In some embodiments, as described above, the machine-learning hand pose model 206 has received an indication that the user is viewing a virtual input device 406 of a selection slider and verifies whether the hand pose matches the expected slider selection hand pose.

Upon determining the hand pose, the hybrid detection system 204 generates one or more segmented areas for the image 402. As shown in FIG. 4B, the hybrid detection system 204 generates a segmented area 408 encompassing the finger tip of the index finger. In some embodiments, the hybrid detection system 204 accesses a segmentation table that indicates that the slider selection hand pose is associated with a segmented area on the index finger. For example, the segmentation table indicates that the segmented area 408 for a slider selection hand pose should span the width of the sliding scale (i.e., the virtual input device 406), as shown. In alternative embodiments, the machine-learning hand pose model 206 determines to generate the first segmented area 408 without accessing a segmentation table, as provided above.

While the segmented area 408 is shown as a single segmented area, the hybrid detection system 204 can utilize any number of segmented areas on the hand pose. For example, the machine-learning hand pose model 206 generates multiple adjacent segmented areas in place of the segmented area 408. In another example, the machine-learning hand pose model 206 generates a segmented area surrounding the user's fingertip. Then, as the machine-learning hand pose model 206 detects the fingertip moving near the edge of the segmented area, the machine-learning hand pose model 206 generates a new segmented area (e.g., corresponding to subsequent images) based on the updated location of the finger, as described above.

In some embodiments, the hand 404 in FIG. 2B could also include one or more anchor segmented areas (not shown), such as where the wrist meet the hand, the center of the palm, or a point at the back of the hand. As mentioned above, the machine-learning hand pose model 206 can determine hand pose changes based on these anchor points to determine whether the user is changing their hand pose. Indeed, the hybrid detection system 204 can utilize anchor points on a predicted hand pose to determine whether the user has moved their hand out of the hand pose.

As shown in FIG. 4B, the hand 404 is at a first location 410a in the first image 402. For example, the first location 410a of the hand corresponds to a current slider position of the virtual input device 406. Indeed, the user can place their hand at the first location 410a to select and adjust the virtual input device 406. Further, in some embodiments, the hybrid detection system 204 can provide tactile and/or audio feedback to the user in response to the user selecting and/or adjusting the virtual input device. For example, the client device vibrates and beeps when the user selects and/or moves the current slider position to a new location along the selection slider.

As shown in FIG. 4C, the hand 404 has moved to a second location 410b within a second image 412. More particularly, in FIG. 4C, the hybrid detection system 204 detects the user's hand 404 is in the same hand pose (e.g., the slider selection hand pose) but at an updated location within the segmented area 408. In some embodiments, the second image 412 is captured immediately after the first image 402. In alternative embodiments, the second image 412 is not captured immediately after the first image 402, but is one of the subsequent images to the first image 402 (e.g., one or more other images occur between the first and the second images).

For ease of explanation, FIG. 4C shows drastic movement of the slider along the virtual input device 406. However, in many cases the movement is much less drastic and not perceivable by the machine-learning hand pose model 206 alone (e.g., in the case of a button press). Accordingly, to determine whether the user provided a hand input corresponding to an input command, the hybrid detection system 204 can perform additional processing with respect to the segmented area 408. Indeed, as described above, a machine-learning model will likely fail to detect very small movements. For example, if the user moves their finger one or two pixels along the slider, the machine-learning model will miss the movement. However, as described herein, the hybrid detection system 204 can detect the small movement and, in response, execute a very fine adjustment on the slider or with regard to another form of input.

Figure 5A:
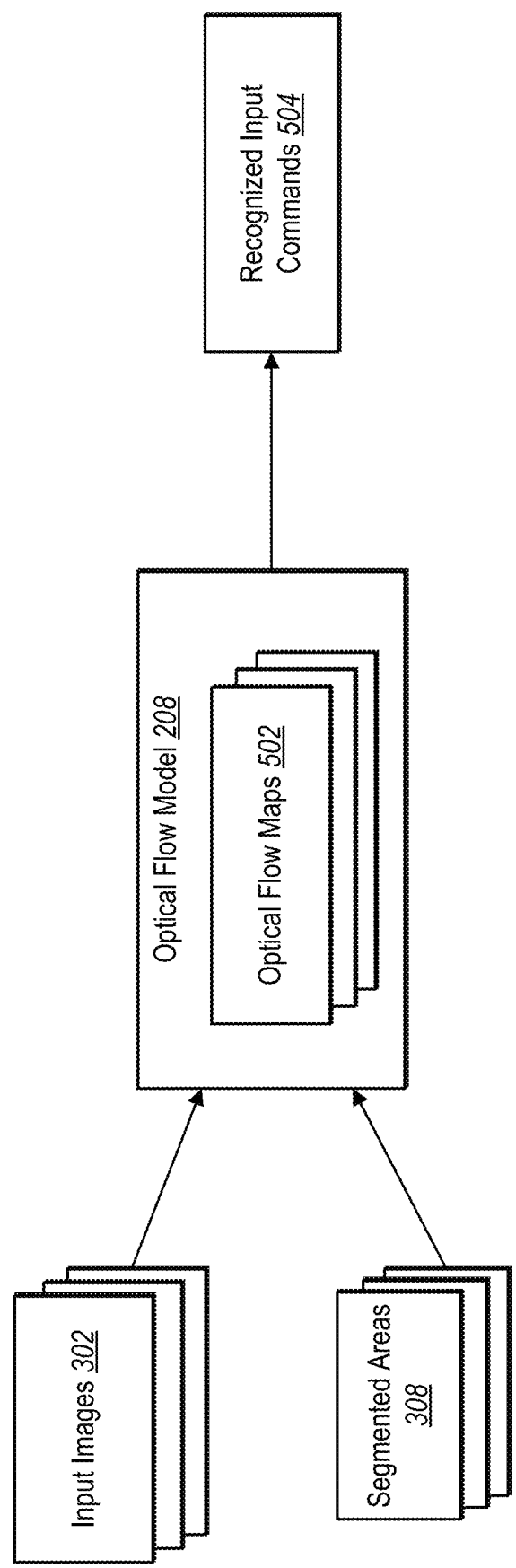
FIGS. 5A-5B illustrate schematic diagrams of an optical flow model pipeline in accordance with one or more embodiments.
Figure 5B:
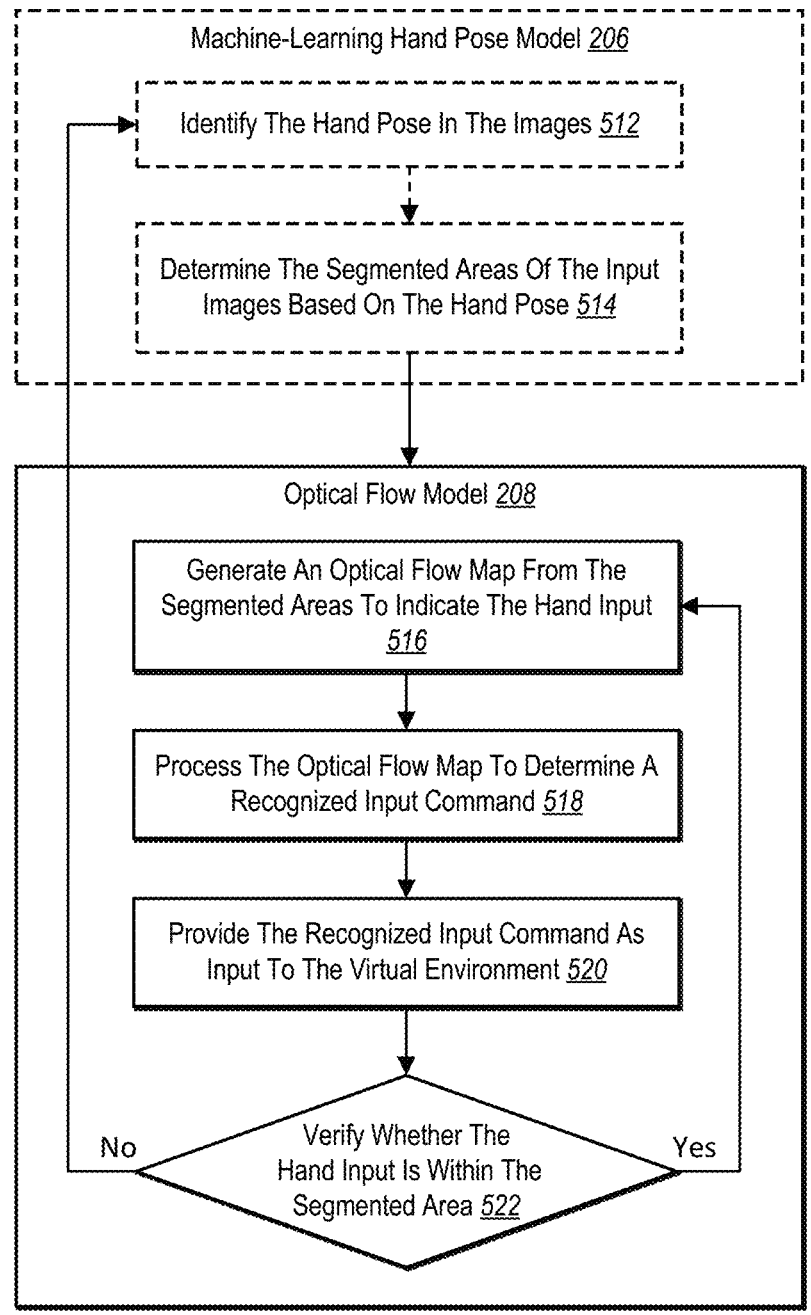
Figure 6A:
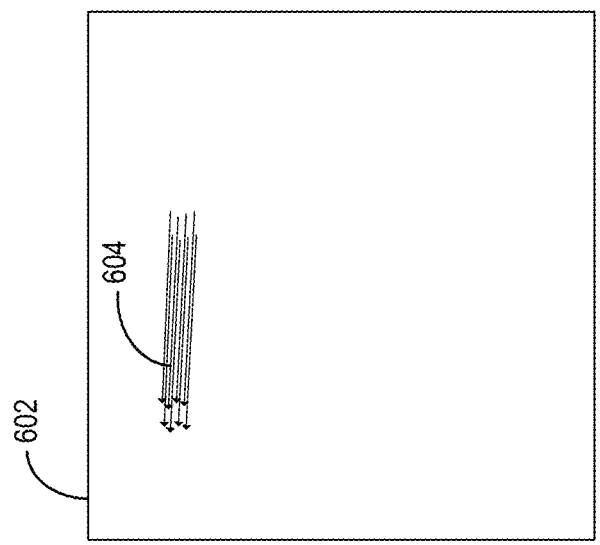
FIGS. 6A-6B illustrate an overview of a process of generating an optical flow vector map utilizing the optical flow model in accordance with one or more embodiments.
Figure 6B:
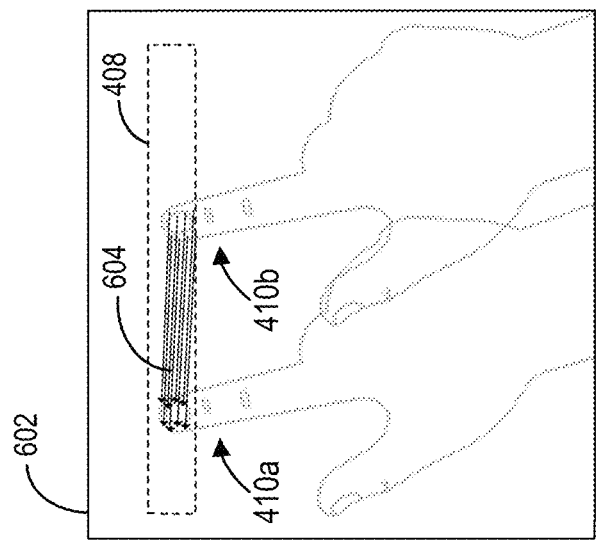
Figure 7:
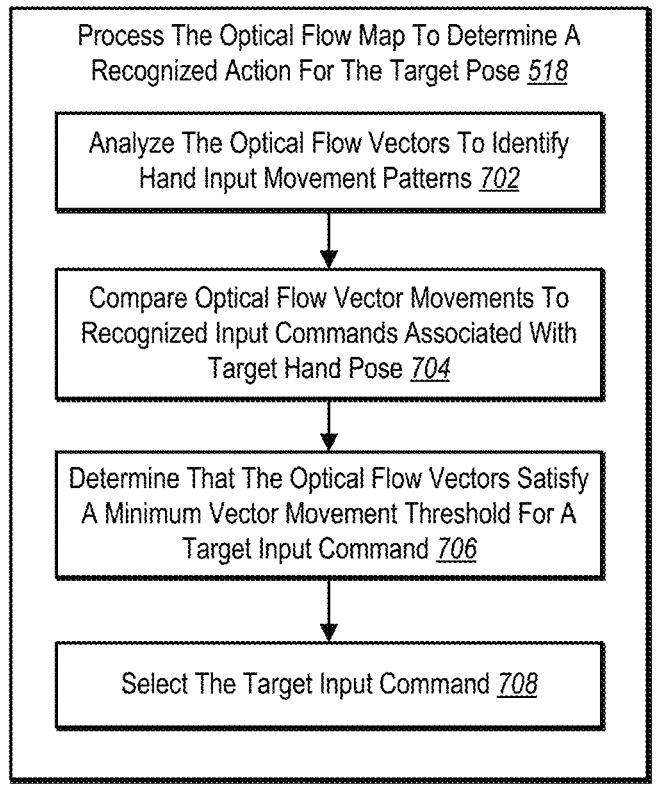
FIG. 7 illustrates a series of acts for processing an optical flow map to determine a recognized action for a target hand pose in accordance with one or more embodiments.

Turning now to FIGS. 5A-7, additional detail is provided regarding the hybrid detection system 204 utilizing the optical flow model 208. In particular, FIGS. 5A-5B correspond to utilizing the optical flow model 208 to detect input commands. FIGS. 6A-6C provide illustrative examples of generating an optical flow vector from segmented areas. FIG. 7 corresponds to processing the optical flow vector to determine an input command corresponding to the hand input.

In particular, FIGS. 5A-5B illustrate schematic diagrams of the optical flow model 208 in accordance with one or more embodiments. As shown in FIG. 5A, the hybrid detection system 204 applies the optical flow model 208 to the input images 302 and corresponding segmented areas 308 to generate optical flow maps 502. Further, the optical flow model 208 can detect input commands 504 based on the optical flow maps 502.

In one or more embodiments, the input images 302 correspond to the input images introduced above in connection with FIG. 3A. For example, the input images 302 correspond to images captured of a user's hands while the user is engaging in a virtual environment. Likewise, the segmented areas 308 correspond to the segmented areas also introduced above in connection with FIG. 3A. For example, the machine-learning hand pose model 206 generates one or more segmented areas 308 for each of the input images 302 and provided the segmented areas to the optical flow model 208 for further processing.

By combining the segmented areas 308 to the input images 302 (e.g., applying each object mask associated with a segmented area to the input images 302), the hybrid detection system 204 can significantly reduce processing at the optical flow model 208. For example, the optical flow model 208 now compares a small number of pixel groups (e.g., segmented images), rather than processing all pixels across all of the input images 302. Unlike the machine-learning hand pose model 206, the optical flow model 208 can detect minute movements, such as pixels being one or two places off from each other in a set of images or pixels moving a few millimeters. Further, the optical flow model 208 can identify vector movement in any valid direction within the optical flow processing area (including depth).

Further, optical flow model 208 can operate at the same sampling rate as images are captured by a camera. For example, if the camera provides images at 10 milliseconds (or another sample rate) increments, the hybrid detection system 204 can perform movement detection for pixels within the segmented areas at the same rate (even if the hybrid detection system 204 detects hand poses and segmented areas with the machine-learning hand pose model 206 at a slower rate). In some embodiments, the hybrid detection system 204 adjusts the camera sample rate based on the type of hand pose detected. For instance, a first type of hand pose may not require as fast a camera sample rate (and corresponding optical flow model 208 processing rate) as a second type of hand pose.

As shown, the optical flow model 208 generates optical flow maps 502 (e.g., vector maps). In particular, the optical flow model 208 utilizes rapid successions of samples from the segmented areas (e.g., pixels within the optical flow processing area) to determine optical flow maps of hand inputs (e.g., fingertip movements) with a high degree of accuracy and timing precision. Indeed, an optical flow map is made up of optical flow vectors, where each optical flow vector indicates how one or more pixels moved from a first location in a first image to a second location in a second image, or even across a series of images (e.g., across five to ten images).

Moreover, an optical flow map can provide information indicating the presence of an opposing force (e.g., a physical surface). To illustrate, when a fingertip comes into contact with a hard surface, another part of the hand, or another physical object, an optical flow vector in an optical flow map can show a sudden stop (e.g., a sudden termination of movement). For example, if a user is pressing a virtual button projected onto a hard surface (e.g., a table), the user's finger moves at a constant rate (e.g., x frames per second) until the finger encounters the hard surface, at which point the rate of movement stops. Accordingly, the optical flow model 208 can utilize the optical flow map to detect sudden termination of movement to identify when a user is providing hand input (e.g., performing a keystroke) within the virtual environment.

In a similar manner, an optical flow map can show a change in direction, which indicates when a user is attempting to provide hand input corresponding to an input command. To illustrate, a user providing hand input corresponding to a scroll can move their finger in a vertical direction (e.g., top to bottom) to scroll through content. At the bottom point of the hand input, the user lifts their finger and moves it back to the top. An optical flow map of this action would show optical flow vectors that change direction each time the user resets their finger. In some instances, the optical flow map can also show when the user is scrolling verses when the user is lifting and resetting their finger to further scroll (e.g., based on the depth indicated in the vector map and/or direction of pixel movement). By utilizing the directional changes in the optical flow map, the optical flow model 208 can detect when a user is providing hand input as well as when a user is expecting the hand input to activate (e.g., scroll) within the virtual environment.

In various embodiments, the optical flow model 208 can normalize the optical flow map 602 to account for movement within the environment. Often, when a user is immersed in a virtual environment, they are moving their head and constantly changing their view. In some embodiments, the segmented areas help isolate hand movement without including background movement, which could negatively affect the optical flow map by introducing false positive movements. In alternative embodiments, the optical flow model 208 can account for the background movement based on one or more approaches and/or techniques.

To illustrate, in one or more embodiments, the optical flow model 208 can obtain environmental metrics from the virtual reality device. For example, the virtual reality device provides the optical flow model 208 with metrics (e.g., simultaneous localization and mapping (SLAM) metrics) regarding the location and movement of the user within the virtual environment. Using the environmental metrics, the optical flow model 208 can generate one or more environmental optical flow vectors that indicate background movement. Further, the optical flow model 208 can apply (e.g., subtract) the environmental optical flow vectors to the vector map to negate the environmental movement and isolate the hand input movement of the user.

In some embodiments, the optical flow model 208 generates the one or more environmental optical flow vectors utilizing an environmental sample area (e.g., a movement control area) located away from the hand pose in the images (e.g., on a non-hand portion of the images), such as in the background. The optical flow model 208 can utilize optical flow tracking to measure the amount of movement within one or more of the environmental sample areas and generate environmental optical flow vectors indicating an amount of environmental movement. In this manner, the optical flow model 208 can determine whether the user is moving their hands uniformly within the changing virtual environment. Again, the optical flow model 208 can normalize (i.e., correct) the optical flow map 602 by negating the environmental movement utilizing the environmental optical flow vectors.

More particularly, in various embodiments, the optical flow model 208 generates flow vectors between two input images that represent the movement of corresponding pixels (e.g., based on comparing pixels between images). Additionally, or in the alternative, the optical flow model 208 can estimate dense correspondences between images to determine depths associated with pixels between two images (e.g., create a depth map using flow vectors). Based on those flow vectors, the optical flow model 208 can identify amounts of movement and generate one or more environmental optical flow vectors that correspond to an optical flow map 602 over time. Further, the optical flow model 208 can apply the environmental optical flow vectors to the optical flow vectors to generate a more accurate version of the optical flow map 602.

In one or more embodiments, the optical flow model 208 can utilize an anchor point on the hand to normalize the optical flow map 602. For example, the optical flow model 208 selects an anchor point on the hand, such as on one or more lower joints of the fingers, the palm, and/or the back of the hand. Then, the optical flow model 208 determines the movement of the segmented area relative to the anchor point. As such, if the anchor point moves slightly between images due to environmental movement, the optical flow model 208 can ignore this noise by determining the movement of the segmented relative to the anchor point. In particular, the optical flow model 208 can correct the optical flow vectors within an optical flow map 602 based on movement relative to the anchor point. In this manner, the optical flow model 208 can normalize an optical flow map 602 without factoring in additional environmental information.

As mentioned above, the hybrid detection system 204 can provide audio and haptic feedback to a user in connection with recognizing and activating the user's hand input. Indeed, by recognizing when a user has provided a hand input (e.g., a sudden stop or a change of direction) the hybrid detection system 204 and/or the optical flow model 208 can provide audio or other haptic feedback to the user confirming their hand input.

As shown in FIG. 5A, the optical flow model 208 generates recognized input commands 504. For example, the optical flow model 208 analyzes one or more optical flow maps 502 and recognizes valid input commands corresponding to the virtual environment in which the user is engaged. FIG. 7 below provides additional detail regarding recognizing input commands based on the optical flow maps 502.

FIG. 5B provides additional detail regarding the optical flow model 208 recognizing and providing an input command to the virtual environment in response to the user's hand input. For context, FIG. 5B also includes the machine-learning hand pose model 206 performing an act 512 of identifying the hand pose in the image and an act 514 of determining the segmented areas of the input images based on the hand pose. The acts 512 and 514 are described above in connection with FIG. 3B with respect to the acts of 310-316.

As shown in FIG. 5B the optical flow model 208 can perform an act 516 of generating an optical flow model 208 from the segmented areas to indicate the hand input of the user. As described above, the optical flow model 208 can track the movement of pixels within a segmented area across a first image and one or more subsequent images (e.g., input images) to indicate the small and discrete movements of the user with respect to a virtual input device. In one or more embodiments, the optical flow model 208 combines all of the pixel movements within segmented areas into a vector map for a given time period (e.g., every 10 milliseconds). In some embodiments, the optical flow model 208 continues to add to an optical flow map until a sudden termination or change in direction is detected.

As shown, the optical flow model 208 can perform an act 518 of processing the optical flow map to determine a recognized input command. For instance, the optical flow model 208 compares the location of the optical flow vectors within the optical flow map to determine a correspondence between the optical flow vectors and an input of the virtual input device. For example, the optical flow map indicates a fast, short, tap on a button of a virtual game controller. FIG. 7 below provides additional detail regarding recognizing input commands based on optical flow maps.

In addition, the optical flow model 208 can perform an act 520 of providing the recognized input command as input to the virtual environment. In one or more embodiments, the optical flow model 208 is located on the virtual reality device along with the virtual reality application that facilitates the virtual environment. In these embodiments, the optical flow model 208 can provide the recognized input command directly to the virtual reality application, which activates the input command in the virtual environment in response to the hand input.

In alternative embodiments, the optical flow model 208 executes the input command by providing the recognized input command to a remote device that is providing the virtual environment. For example, a server device is streaming the virtual environment to a user. In response, upon the optical flow model 208 recognizing the input command, the optical flow model 208 can provide the recognized input command to the server device. In some embodiments, the optical flow model 208 can provide the segmented areas and/or the optical flow map to the server device, and a portion of the hybrid detection system 204 on the server device can recognize and apply an input command.

Further, the optical flow model 208 can perform an act 522 of verifying whether the hand input is within the segmented area. As described above, the hybrid detection system 204 can generate a segmented area for a first image and one or more subsequent images. Further, the optical flow model 208 tracks pixel movement through the segmented area over time through the subsequent images. If one or more pixels move too far over time without stopping or changing direction, the pixels will move beyond the boundaries of the segmented area (e.g., the user moves their fingertip out of the segmented area). Accordingly, the optical flow model 208 can determine whether pixels associated with the hand input is within the segmented area. Similarly, the hybrid detection system 204 can determine that the hand input is not within the segmented area based on a threshold number of pixels moving a threshold amount within the segmented area.

When the optical flow model 208 determines that the hand input (e.g., the user's fingertip) is not within the segmented area, the optical flow model 208 can signal to the machine-learning hand pose model 206 to re-identify the hand pose (e.g., the act 512) to determine if the hand pose has changed and/or to generate a new or updated segmented area for the hand input (e.g., the act 514). For example, in respond to the hand pose reevaluation request from the optical flow model 208, the machine-learning hand pose model 206 determines a new segmented area of the hand input based on a second and third image.

In general, the optical flow model 208 operates at a higher rate than the machine-learning hand pose model 206. For example, in some embodiments, the optical flow model 208 operates at 10 milliseconds (or the camera sampling rate) while the machine-learning hand pose model 206 operates at 500 milliseconds. Accordingly, the optical flow model 208 can detect a need to re-identify a hand pose before the machine-learning hand pose model 206 is set to reevaluate the hand pose.

The optical flow model 208 can determine whether the hand input is within a segmented area in one or more ways. To illustrate, in various embodiments, the optical flow model 208 can measure the length of the optical flow vectors to a threshold length to determine whether the length satisfies the threshold length (e.g., exceeds a tolerance range). In some embodiments, the threshold length corresponds to the width or height (or a portion) of the segmented area. For example, if an optical flow vector is over half of the width or height of the segmented area, the optical flow model 208 signals the machine-learning hand pose model 206 to re-identify the hand pose (e.g., the act 512).

In some embodiments, the optical flow model 208 determines whether an optical flow vector meets a boundary of the segmented area or is within a predetermined distance of the boundary (e.g., 10% of the width or 5 pixels). In this manner, when an optical flow vector approaches or meets the segmented area boundary, the optical flow model 208 can trigger the hybrid detection system 204 to re-position the segmented area (e.g., generate a new segmented area) to ensure that hand input information is not lost.

In some embodiments, as described above, the hybrid detection system 204 can expand a segmented area in response to the optical flow model 208 determining that a pixel and/or optical flow vector is near the edge of a segmented area. For example, the optical flow model 208 signals the position of the pixel in the latest image to the machine-learning hand pose model 206, and in response, the machine-learning hand pose model 206 enlarges the segmented area to allow for more movement of the pixel. In additional embodiments, the machine-learning hand pose model 206 can also reduce to size of a segmented area based on lack of movement in a portion of the segmented area, as described above. For instance, the machine-learning hand pose model 206 grows one side of a segmented area while reducing the opposite side of the segmented area as the machine-learning hand pose model 206 tracks the hand input over time.

If the optical flow model 208 determines that the hand input is within the segmented area, the optical flow model 208 can repeat the acts 516-522 for each recognized hand input. In many instances, the hand input will remain within the one or more original segmented areas generated by the machine-learning hand pose model 206. For example, in the case of a game controller, a user will largely keep their fingers near the same buttons and trigger, and thus, in the same segmented areas. In these embodiments, the optical flow model 208 can iterate numerous times with the same hand pose and segmented areas, without the support of the machine-learning hand pose model 206.

FIGS. 6A-6B illustrate generating an optical flow vector map utilizing the optical flow model in accordance with one or more embodiments. As shown, FIG. 6A includes an optical flow map 602 based on the hand input shown in FIGS. 4A-4C. For ease of explanation, FIG. 6A includes the hand in the first location 410*a* and in the second location 410*b* (partially faded for clarity) as well as the segmented area 408 determined by the machine-learning hand pose model 206.

FIG. 6A also includes optical flow vectors 604. As shown, the optical flow model 208 can generate the optical flow vectors 604 by indicating corresponding pixel movement within the segmented area 408 between the first image and the second image. Indeed, the optical flow model 208 can plot the pixel movement of each pixel from the first image through subsequent images within the segmented area 408, until the pixel movement stops or changes direction, to generate an optical flow vector of the pixel. In one or more embodiments, the optical flow model 208 can implement an optical flow technique as described in Javier Sanchez, Enric Meinhardt-Llopis, Gabriele Facciolo, *TV-L1 Optical Flow Estimation*, Image Processing On Line, 3 (2013), which is incorporated herein by reference in its entirety.

FIG. 6B illustrates the optical flow map 602 of the optical flow vectors 604 with the portions from FIGS. 4A-4B removed. In some embodiments, the optical flow map will show multiple groupings of optical flow vectors corresponding to different hand input of the user. In various embodiments, the optical flow model 208 records a timestamp on each optical flow map to maintain an order sequence between multiple optical flow maps and hand inputs. Further, the optical flow model 208 can determine whether the user was providing two or more different hand inputs at the same time (e.g., pressing multiple buttons at the same time on a virtual game controller), or if the user was providing hand inputs in rapid succession.

As described above, the optical flow model 208 can generate an environmental optical flow vector. In one or more embodiments, the optical flow model 208 utilizes an environmental sample area within the input images to track non-hand input pixel movement. For example, the optical flow model 208 generates an environmental optical flow map of the environmental motion utilizing similar approaches and techniques described above. Additionally, or in the alternative, the optical flow model 208 can apply the environmental optical flow vectors and/or environmental optical flow map to the optical flow map to correct or normalize the optical flow map to improve the accuracy of the hand input detection.

FIG. 7, as mentioned above, illustrates a series of acts for processing an optical flow map to determine a recognized action for a target hand pose in accordance with one or more embodiments. As shown, FIG. 7 expands the act 518 introduced above in connection with FIG. 5B. In various embodiments, the optical flow model 208 and/or the hybrid detection system 204 performs the series of acts shown in FIG. 7.

As shown, the optical flow model 208 can perform an act 702 of analyzing the optical flow vectors within the optical flow map to identify hand input movement patterns. For example, the optical flow model 208 can determine the starting point and stopping point of the optical flow vectors. In addition, the optical flow model 208 can identify the sudden termination and/or change in direction of one or more optical flow vectors based on the optical flow map. Further, the optical flow model 208 can normalize the optical flow map based on optical flow environmental vectors, as described above.

Also, as shown, the optical flow model 208 can perform an act 704 of comparing optical flow vector movements to recognized input commands associated with the target hand pose. For instance, in various embodiments, the optical flow model 208 identifies a list of available input commands based on the identified hand pose and/or the corresponding virtual environment. For example, a game controller hand pose can correspond to button, trigger, and joystick inputs, but does not correspond to keys on a keyboard. Accordingly, upon identifying the hand pose and/or virtual environment, the optical flow model 208 can narrow down the list of available input commands.

In additional embodiments, the optical flow model 208 can also compare the optical flow vectors to the area of a corresponding virtual input device. For example, the optical flow model 208 can compare the location of the optical flow vectors in the optical flow map to inputs of a virtual input device to identify the inputs to which the optical flow vectors correspond. For example, the optical flow model 208 overlays the optical flow map on a virtual keyboard to determine at which key the optical flow vectors suddenly terminated.

In some embodiments, the optical flow model 208 maintains an input command index of locations corresponding to input commands. In these embodiments, the optical flow model 208 can compare the optical flow vectors to the input command index (e.g., at one of the end points or at another point) to determine to which input command the optical flow vectors correspond. For example, each input command has an input area (e.g., a square or a circle) defining the boundaries of the input, and the optical flow model 208 determines if the optical flow vectors fall within the boundary.

In one or more embodiments, the optical flow model 208 determines that multiple hand inputs are present at the same time, or near, the same time. For instance, the optical flow model 208 identifies two optical flow maps with the same timestamp or within a time threshold of each other (e.g., <15 milliseconds). In some instances, the optical flow model 208 determines that the two optical flow maps overlap in time for at least an overlapping time threshold. In either case, the optical flow model 208 identifies a separate input command for each of the hand inputs. Often, however, the two separate inputs can combine to form a new input command (e.g., "shift"+"q" equals "Q").

As shown in FIG. 7, the optical flow model 208 can perform an act 706 of determining that the optical flow vectors satisfy a minimum vector movement threshold for a target input command. For example, if an optical flow vector does not indicate a sudden stop or change in direction (e.g., indicating that the hand input a hard surface) with respect to the identified input command, the optical flow model 208 can verify that the length of the optical flow vector meets or exceeds a minimum vector movement threshold. In various embodiments, the minimum vector movement threshold ensures that hand movement between images represent a hand input rather than arbitrary hand movements (e.g., drifting fingers). In this manner, by utilizing the minimum vector movement threshold, the optical flow model 208 can reduce the number of false positive hand inputs.

Further, the optical flow model 208 can perform an act 708 of selecting the target input command. Indeed, as shown, the optical flow model 208 can select the recognized input command and execute the input command, as described above. For instance, the optical flow model 208 can directly or indirectly provide the input command to the virtual reality device that is providing the virtual environment in which the user is engaged.

Figure 8A:
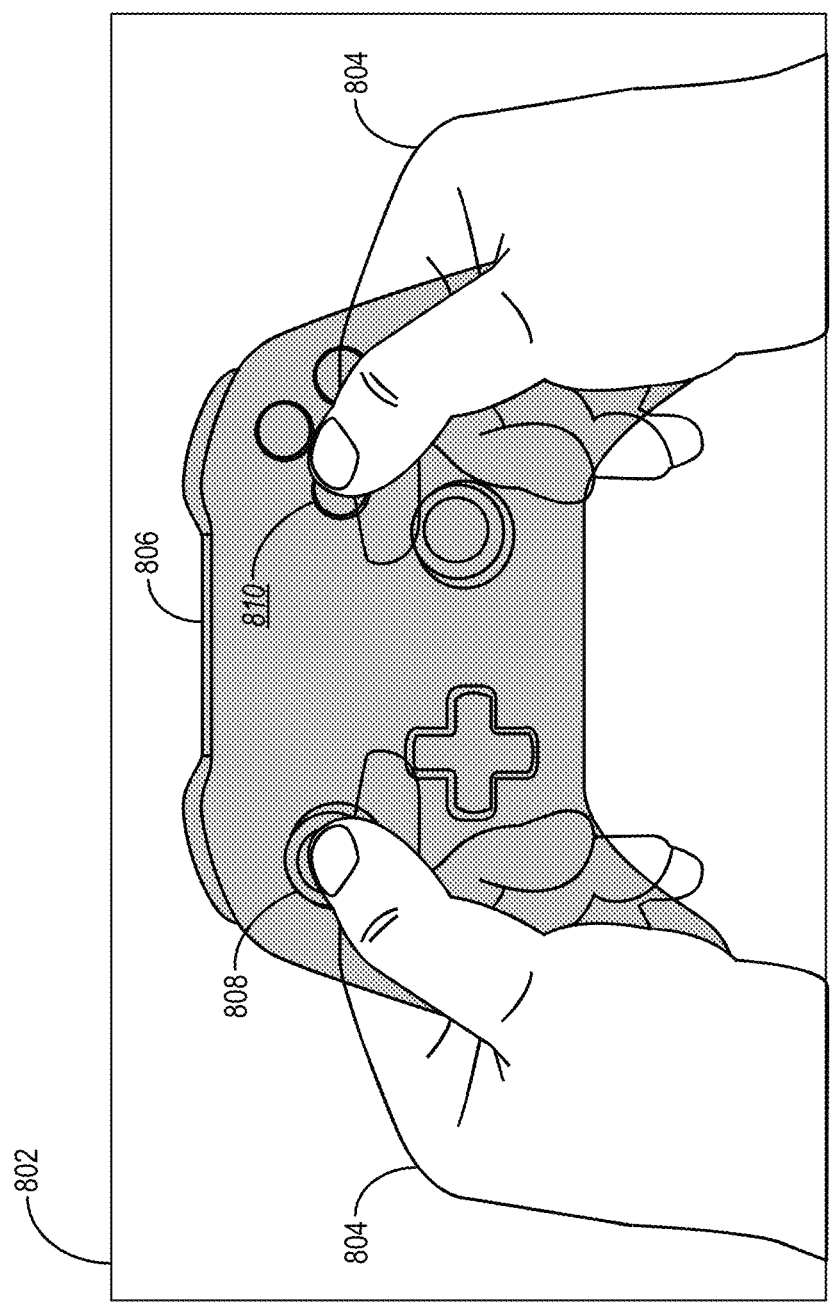
Figure 8C:
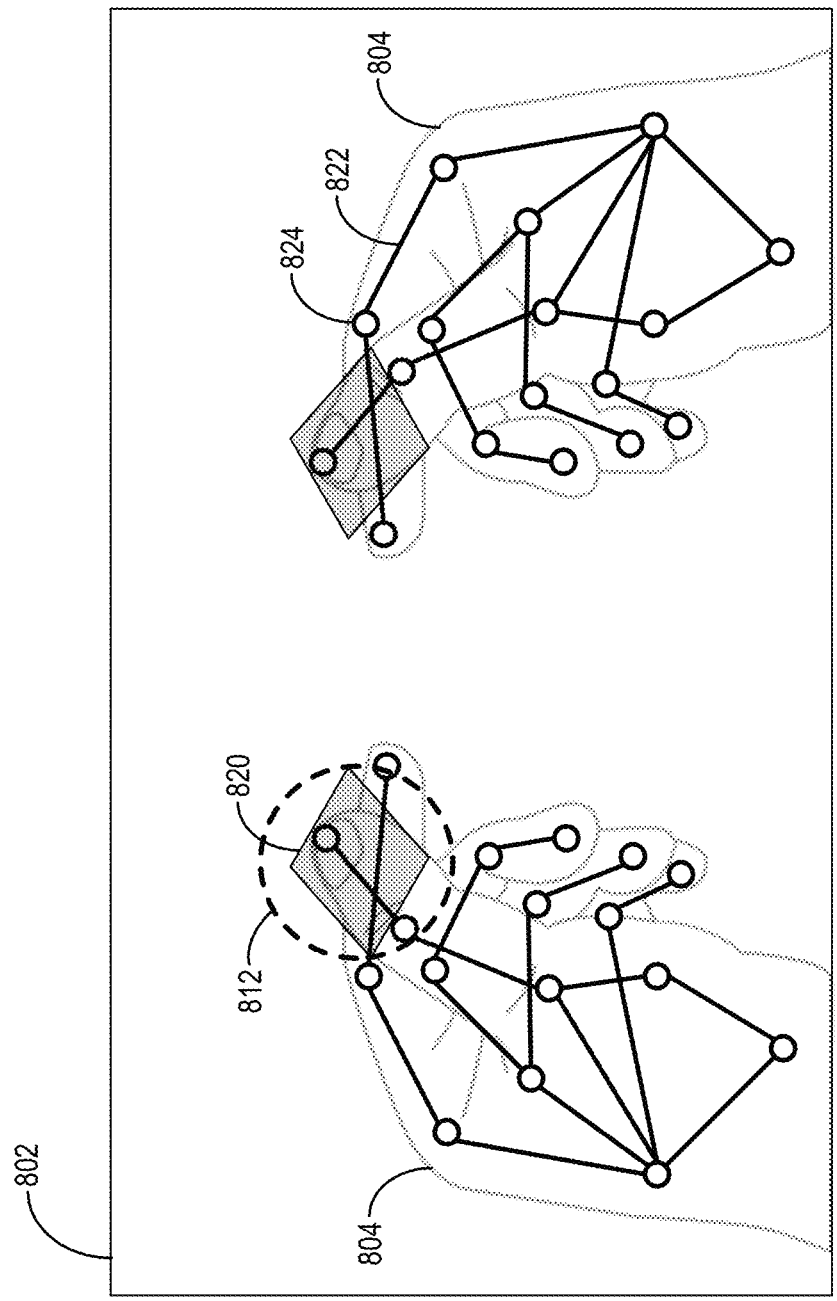

FIGS. 8A-8C illustrate example diagrams of detecting user hand inputs with respect to a virtual game controller in accordance with one or more embodiments. As shown in FIG. 8A-8C, an image 802 includes hands 804 in a game controller hand pose holding a game controller 806 (i.e., a virtual input device). While FIGS. 8A-8C provide description with respect to a virtual game controller, the disclose can be expanded to apply to other types of virtual input devices.

In various embodiments, the hybrid detection system 204 detects that the user's hands are in the game controller hand pose, as described above. In additional embodiments, upon detecting the game controller hand pose, the hybrid detection system 204 can cause the virtual game controller 806 to appear within the hands of the user. Additionally, the hybrid detection system 204 can resize the virtual game controller 806 to match the size of the user's hands. In some instances, upon detecting a non-hand input pose, the hybrid detection system 204 can hide the virtual game controller.

In alternative embodiments, the hybrid detection system 204 can first provide the virtual game controller 806 within the virtual environment and prompt the user the "hold" the virtual input device. For example, upon entering a game, the hybrid detection system 204 provides the virtual game controller 806 to the user, and enables the user to configure his or her hands into the game controller hand pose.

In various embodiments, the hybrid detection system 204 displays the virtual game controller 806 within the virtual environment. For example, the hybrid detection system 204 provides the hands 804 or a three-dimensional rendering of the hands within the virtual environment. In one or more embodiments, the hybrid detection system 204 provides the hands 804 within the virtual environment even when the scope of the virtual environment does not naturally include the hands of the user (e.g., the user is looking up away from their hands). In addition, the hybrid detection system 204 can provide the hands 804 within the virtual environment when the hands are within the field-of-view of the user. In some embodiments, the hybrid detection system 204 simulates hand movement over the virtual game controller 806 in response to detecting corresponding user hand movement.

As shown in FIG. 8A, the thumbs of the hands 804 are positioned over inputs of the virtual game controller 806. For example, the left thumb is over a left joystick 808 and the right thumb is above one or more buttons 810. Further, the thumbs can reach additional inputs (e.g., buttons or joysticks) of the virtual game controller 806.

While a physical controller provides a user with a tangible object to hold and activate, in some cases, the user cannot achieve the same experience with a virtual controller. For example, the user cannot easily distinguish between adjacent buttons without tactile feedback. Accordingly, in some embodiments, the hybrid detection system 204 enables a user to remap the virtual game controller 806 to match the their hands.

To illustrate, FIG. 8B shows a modified version of the virtual game controller when buttons are replaced with areas along the user's fingers. More particularly, FIG. 8B shows contact areas 812-816 of the hands 804 where the user can press to activate inputs of the virtual game controller. For example, the first contact area 812 can represent the left joystick, the second contact area 814 can represent one or more buttons on the virtual game controller, and the third contact area 816 can represent a different button of the virtual game controller. In various embodiments, the hybrid detection system 204 can enable the user to specify contact areas and/or input preferences associated with each contact area.

As shown, when a user presses their left thumb along the skin of their left index finger within the first contact area 812, the hybrid detection system 204 can detect the sudden stop and/or change in direction in the optical flow map. In response, the hybrid detection system 204 can identify and apply the input corresponding to hand input within the virtual environment. Similarly, when the left thumb of the user enters into another contact area, the hybrid detection system 204 can determine the corresponding input command.

As mentioned above, the hybrid detection system 204 can remap the inputs of the virtual game controller based on user preferences. Indeed, the hybrid detection system 204 can enable the user to position input commands in intuitive locations based on the user's hand size and shape. In some embodiments, the hybrid detection system 204 can provide one or more predetermined controller configuration to the user as well as fit a selected predetermined controller configuration to the user's hands.

FIG. 8C shows generating segmented areas 820 over the thumbs of the user's hands. As mentioned above, the hybrid detection system 204 can analyze the hand pose to determine that the hands match a game controller hand pose. For example, the hybrid detection system 204 can apply the image 802 to the machine-learning hand pose model 206 to identify skeletal structure 822 and key points 824 along the hands 804. Then, using the skeletal structure 822 and/or key points 824, the machine-learning hand pose model 206 can identify the hand pose, as provided above.

In additional embodiments, the hybrid detection system 204 determines segmented areas based on the hand pose. For example, the machine-learning hand pose model 206 detects that hands in the game controller hand pose should have segmented areas above the thumbs. Accordingly, the machine-learning hand pose model 206 locates the last thumb joints and tips of the thumbs to generate the segmented area 820, as described above.

Further, as described above, the hybrid detection system 204 can detect movement within the segmented areas 820. For example, in response to the user moving their right thumb, the optical flow model 208 analyzes the corresponding pixels within the right segmented area across images and detects movement. In particular, the optical flow model 208 generates an optical flow map and utilizes the optical flow map to determine that the user selected a button directly below their right thumb. Accordingly, the hybrid detection system 204 provides the recognized input command to the virtual environment for execution.

Figure 9:
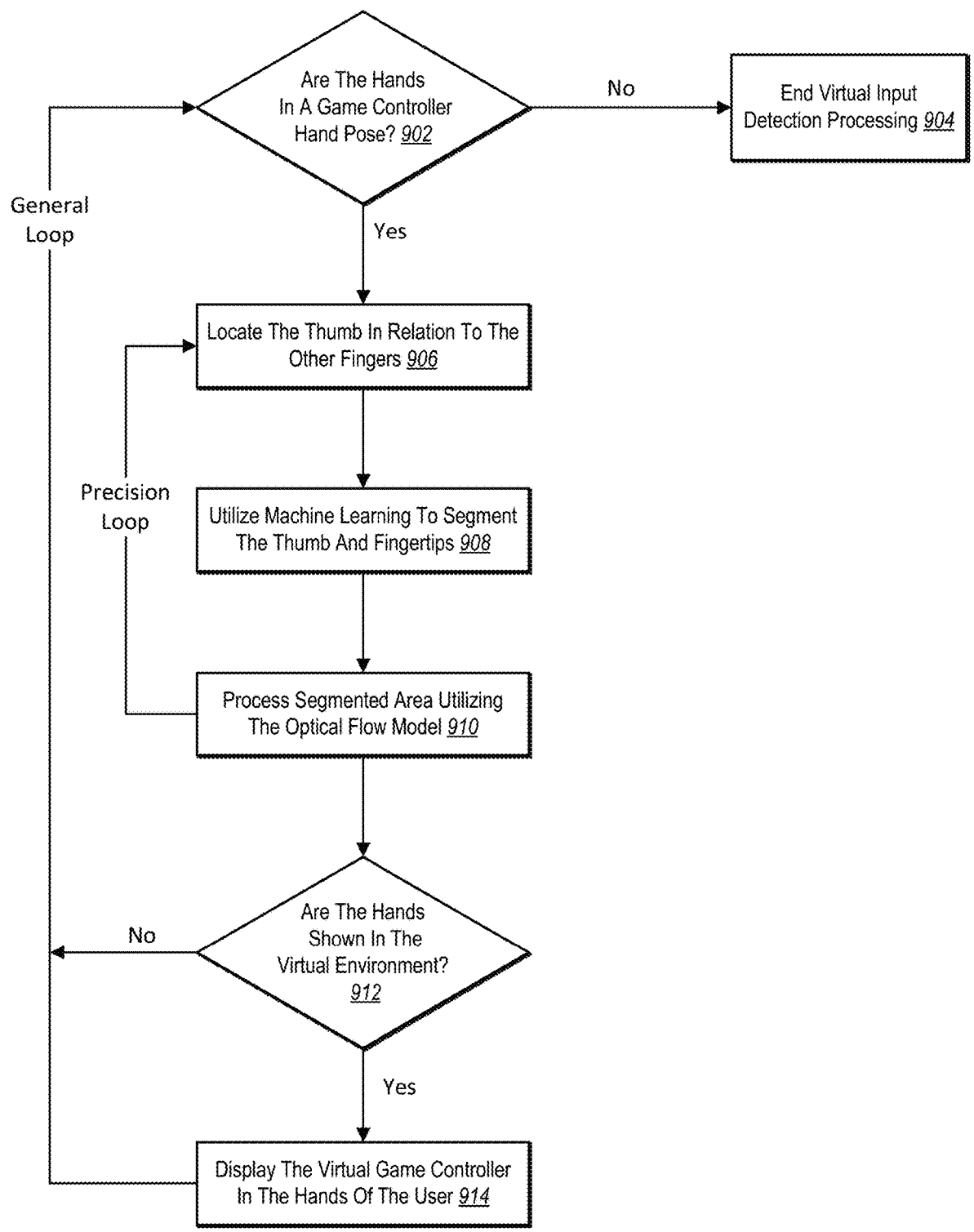
FIG. 9 illustrates a state diagram of detecting hand inputs with respect to the virtual game controller in accordance with one or more embodiments.

To further illustrate, FIG. 9 shows a state diagram of detecting hand inputs with respect to the virtual game controller in accordance with one or more embodiments. As shown, the hybrid detection system 204 can perform the act 902 of determining if the hands are in a game controller hand pose. If not, the hybrid detection system 204 can end the virtual input detection processing (e.g., the act 904).

If the hybrid detection system 204 detects that the hands of the user are in the game controller game pose, the hybrid detection system 204 can perform the act 906 of locating the thumb in relation to the other fingers. In some embodiments, the hybrid detection system 204 utilizes the machine-learning hand pose model 206 to identify a skeletal structure of the hands. Then, based on the skeletal structure, the machine-learning hand pose model 206 locates the thumbs on the hands.

In addition, the hybrid detection system 204 can perform the act 908 of utilizing machine learning to segment the thumb and the fingers. For example, the hybrid detection system 204 utilizes the machine-learning hand pose model 206 to generate a segmented area that isolates the thumbs from the other fingers, as shown in FIG. 8C. Further, the hybrid detection system 204 can process the segmented area utilizing the optical flow model 208, as detailed above.

As shown, in some embodiments, the acts 906-910 can be part of a precision loop. For example, the hybrid detection system 204 preforms the acts 906-910 at the sampling rate of the camera (e.g., 10 milliseconds). In this manner, the hybrid detection system 204 can continually detect and provide all of the user's fast and/or small hand inputs to the virtual environment. Also, in some embodiments, as mentioned above, the sampling rate of the optical flow model 208 and/or camera can vary based on the detected hand pose.

Moreover, the hybrid detection system 204 can perform the act 912 of determining whether the hand are shown in the virtual environment. As mentioned above, in various embodiments, the hybrid detection system 204 displays the hands in the virtual environment. For example, in the case of augmented reality, a user can see their own hands when looking down. In full immersive virtual reality, the hybrid detection system 204 can provide a rendition of the hands of the user based on the user's field-of-view and/or preferences of the user (e.g., the user selects an option to see their hands in the virtual environment).

If the hands of the user are not shown in the virtual environment, the hybrid detection system 204 can go back to the act 902 of determining whether the hands of the user are in the game controller position. Otherwise, the hybrid detection system 204 can perform the act 914 of displaying the virtual game controller in the hands of the user. For example, the hybrid detection system 204 shows the virtual game controller being held by the user. In some embodiments, the hybrid detection system 204 can also show detected movements of the user with respect to the virtual game controller, as described above.

As shown, in various embodiments, the acts 902, 906-914 make up a general loop. For example, the hybrid detection system 204 performs these acts at 1 Hertz compared to the precision loop that occurs at 10 milliseconds. As mentioned above, in some embodiments, the hybrid detection system 204 can trigger the acts in the general loop to perform more frequently, if needed (e.g., when the hand input is no longer within the segmented area).

Figure 10:
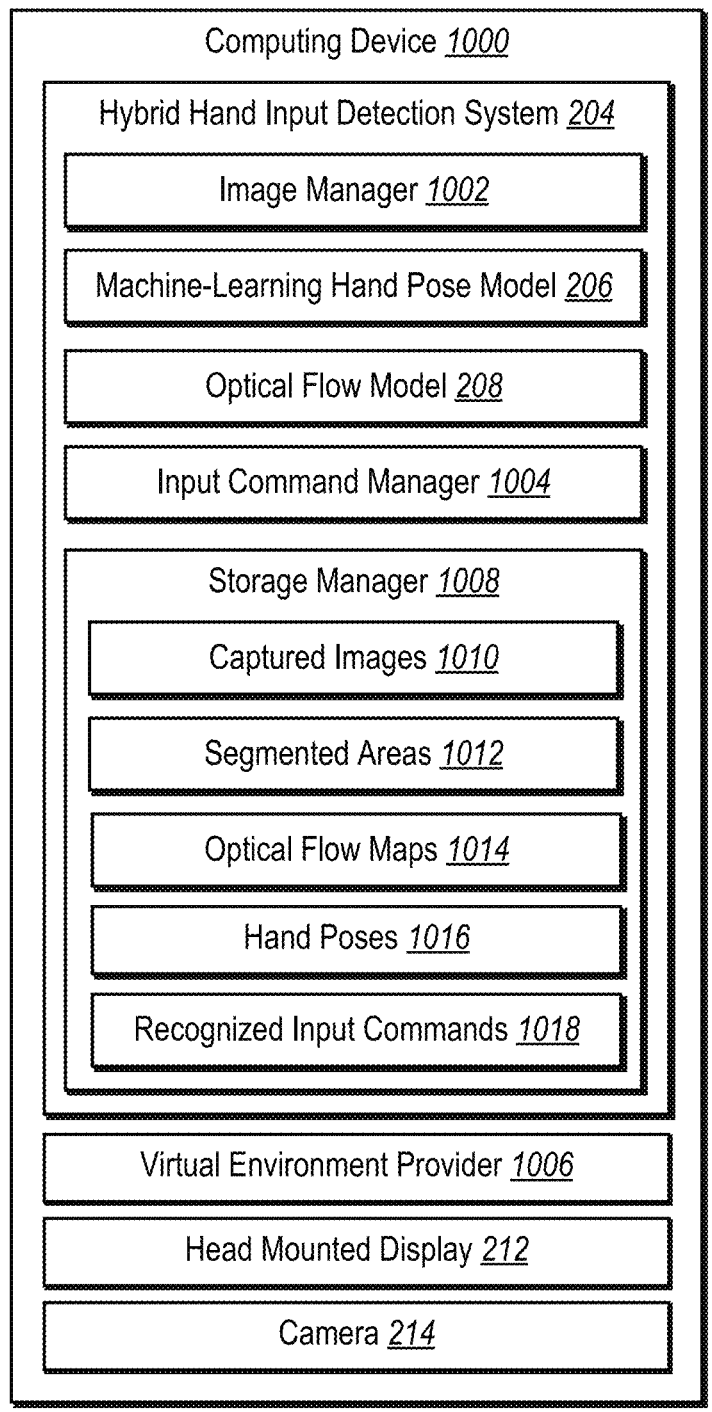
FIG. 10 illustrates an example architecture of the hybrid hand input detection system in accordance with one or more embodiments.

Turning now to FIG. 10, additional detail is provided regarding components and capabilities of the hybrid detection system 204 in accordance with one or more embodiments. As shown, the hybrid detection system 204 is implemented by a computing device 1000. In some embodiments, the computing device is a virtual reality device (e.g., the virtual reality device 202). In one or more embodiments, the computing device 1000 is a client device. In alternative embodiments, the computing device 1000 is a server device (e.g., the server device 220).

As shown in relation to FIG. 10, the computing device 1000 includes the hybrid hand input detection system 204, the head-mounted display 212, and the camera 214, each of which are introduced above in connection with FIG. 2. In addition, the computing device includes a virtual environment provider 1006, which can correspond to the virtual environment application 210 and/or the virtual environment content provider 222 introduced above in connection with FIG. 2.

As shown, the hybrid detection system 204 can include an image manager 1002, the machine-learning hand pose model 206, the optical flow model 208, an input command manager 1004, and a storage manager 1008. The storage manager 1008 can include captured images 1010, segmented areas 1012, optical flow maps 1014, hand poses 1016, and recognized input commands 1018. Additional detail regarding each of the components of the hybrid detection system 204 will be provided in turn.

As shown, the hybrid detection system 204 includes the image manager 1002. The image manager 1002 can create, modify, edit, remove, distribute, share and/or manage digital images in connection with the hybrid detection system 204. For example, the image manager 1002 can communicate with the camera 214 to capture a first image and one or more subsequent images that shown the hands of a user. In addition, the image manager 1002 can store and retrieve the captured images 1010 within the storage manager 1008.

As shown, the hybrid detection system 204 includes the machine-learning hand pose model 206. The machine-learning hand pose model 206 can determine the hand poses 1016 based on one or more captured images 1010. As described above, the hybrid detection system 204 can train the machine-learning hand pose model 206 to learn to detect hand poses 1016 based on key points, skeletal structure, degrees of freedom, and other hand features. As shown, the machine-learning hand pose model 206 can store and retrieve hand poses 1016 from the storage manager 1008.

In additional embodiments, the machine-learning hand pose model 206 can generate segmented areas 1012 within the captured images 1010. As provided above, the machine-learning hand pose model 206 can identify one or more segmented areas based on the identified hand pose. Further, the machine-learning hand pose model 206 can apply an object mask to one or more captured images 1010 based on one or more segmented areas 1012, as detailed above.

As shown, the hybrid detection system 204 includes the optical flow model 208. The optical flow model 208 can process the segmented areas 1012 to determine optical flow maps 1014 between a first image and one or more subsequent images (e.g., the captured images 1010). As described above, in some embodiments, the optical flow model 208 can utilize an environmental optical flow vector to negate environmental movement from the optical flow maps 1014.

In some embodiments, the optical flow model 208 can also recognize input commands. For example, based on one or more of the optical flow maps 1014, the optical flow model 208 identifies one or more recognized input commands 1018, as provided above. In various embodiments, one or more of the recognized input commands 1018 are associated with one or more of the hand poses 1016. Further, in various embodiments, the optical flow model 208 provides the recognized input commands 1018 to the virtual environment, as described above.

As shown, the hybrid detection system 204 includes the input command manager 1004. In various embodiments, the input command manager 1004 executes recognized input commands 1018. For example, the input command manager 1004 provides the recognized input commands 1018 directly (e.g., within the computing device 1000) to the virtual environment and/or the virtual environment provider 1006. In alternative embodiments, the input command manager 1004 provides the recognized input commands 1018 to a remote device, as explained earlier. In some embodiments, the input command manager 1004 operates in connection with the optical flow model 208 to recognize, store, provide, and execute the recognized input commands 1018.

As shown, the hybrid detection system 204 includes the storage manager 1008. In one or more embodiments, the storage manager 1008 maintains data for the hybrid detection system 204 at the computing device 1000. In various embodiments, the storage manager 1008, or a portion thereof, is located at a remote storage device. Also, the storage manager 1008 can maintain data of any type, size, or kind, as necessary to perform the functions of the hybrid detection system 204. For example, as shown, the storage manager 1008 maintains data including captured images 1010, segmented areas 1012, optical flow maps 1014, hand poses 1016, and recognized input commands 1018.

The components shown in FIG. 10 can include software, hardware, or both. For example, these components can include one or more instructions stored on a computer-readable storage medium and executable by processors of one or more computing devices, such as a client device or server device. When executed by the one or more processors, the computer-executable instructions of the computing device 1000 can cause the computing device 1000 to perform the hand input detection methods described herein. Alternatively, the components shown in FIG. 10 can include hardware, such as a special-purpose processing device to perform a certain function or group of functions. Alternatively, these components can include a combination of computer-executable instructions and hardware.

Furthermore, the components shown in FIG. 10 can be, for example, implemented as one or more operating systems, as one or more stand-alone applications, as one or more modules of an application, as one or more plug-ins, as one or more library functions or functions called by other applications, and/or as a cloud computing model. Thus, the components can be implemented as a stand-alone application, such as a desktop or mobile application. Furthermore, these components can be implemented as one or more web-based applications hosted on a remote server. These components can also be implemented in a suite of mobile device applications or "apps."

FIGS. 1-10, the corresponding text, and the examples provide several different systems, methods, techniques, components, and/or devices of the hybrid detection system 204 in accordance with one or more embodiments. In addition to the above description, one or more embodiments can also be described in terms of flowcharts including acts for accomplishing a particular result. In addition, FIG. 11 may be performed with more or fewer acts. Further, the acts may be performed in differing orders. Additionally, the acts described herein may be repeated or performed in parallel with one another or parallel with different instances of the same or similar acts.

Figure 11:
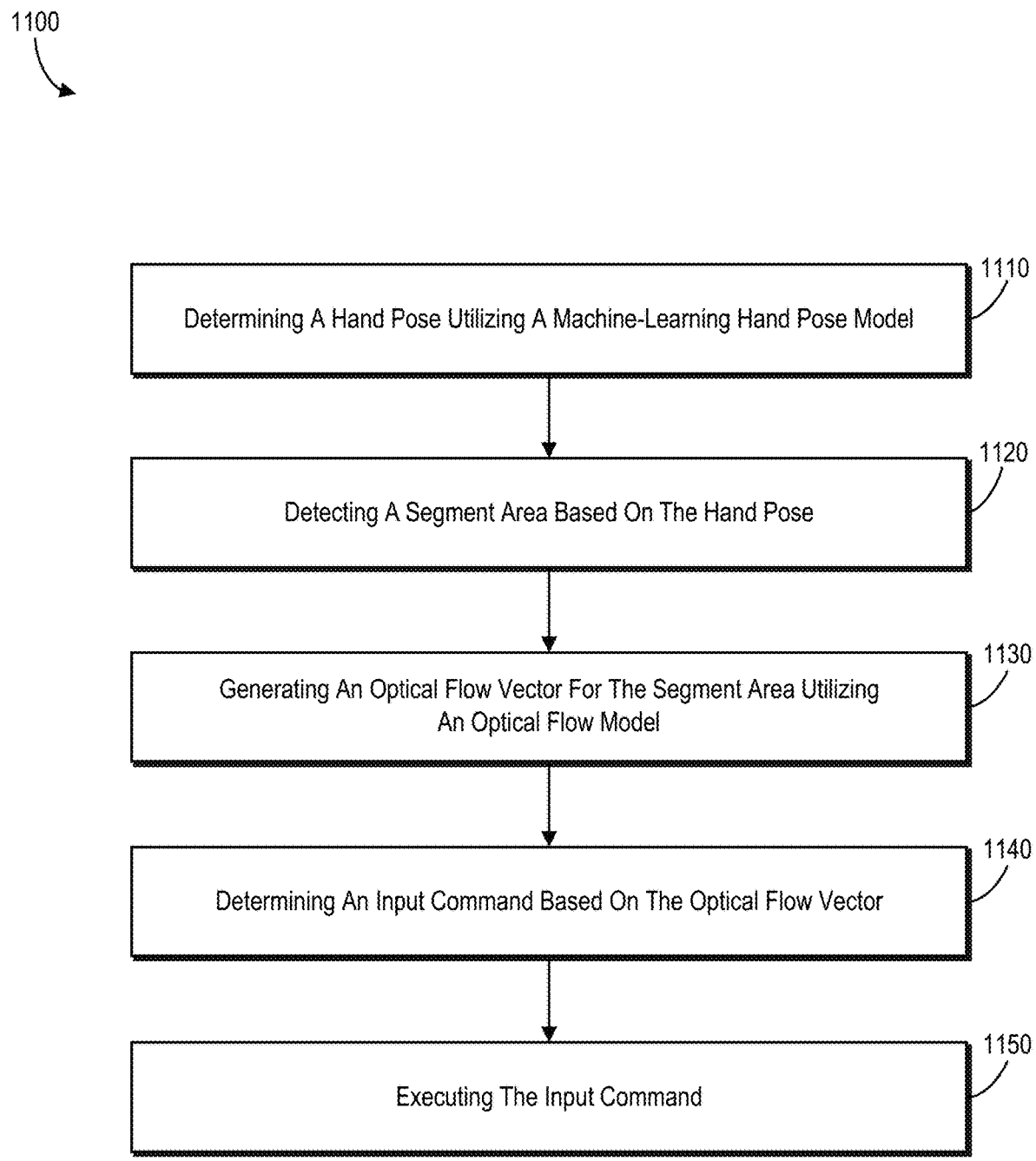
FIG. 11 illustrates a flowchart of a series of acts of detecting fast and precise hand inputs in a virtual environment in accordance with one or more embodiments.

While FIG. 11 illustrates a series of acts 1100 according to particular embodiments, alternative embodiments may omit, add to, reorder, and/or modify any of the acts shown. The series of acts of FIG. 11 can be performed as part of a method. Alternatively, a non-transitory computer-readable medium can comprise instructions, when executed by one or more processors, cause a computing device (e.g., a virtual reality device, a client device, and/or a server device) to perform the series of acts of FIG. 11. In still further embodiments, a system performs the acts of FIG. 11.

To illustrate, FIG. 11 shows a flowchart of a series of acts 1100 of detecting fast and precise hand inputs in a virtual environment in accordance with one or more embodiments. In some embodiments, the series of acts 1100 is performed by a virtual reality system (e.g., a virtual reality device) that includes one or more cameras and at least one head-mounted display (e.g., a virtual reality display).

As shown, the series of acts 1100 includes the act 1110 of determining a hand pose utilizing a machine-learning hand pose model. For example, the act 1110 can include determining, utilizing a machine-learning hand pose model, a pose of a hand within a first image. In some embodiments, the act 1110 includes capturing, in real-time, the first image and the one or more subsequent images utilizing a camera that is associated with the virtual reality device. In one or more embodiments, the act 1110 includes analyzing key points of the hand to identify the pose of the hand from a plurality of hand poses.

As shown, the series of acts 1100 includes the act 1120 of detecting a segmented area based on the hand pose. For example, the act 1120 can include detecting a segmented area in the first image and in one or more subsequent images based on the pose of the hand. In one or more embodiments, the act 1120 can include identifying a portion of the first image and a portion of the one or more subsequent images that encompass a last finger joint of a finger of the hand. In one or more embodiments, the act 1130 can include generating an object mask corresponding to the segmented area. In some embodiments, the act 1120 can include generating one or more segmented images based on applying the segmented area to the first image and the one or more subsequent images.

Also, the series of acts 1100 also includes an act 1130 of generating an optical flow vector for the segmented area utilizing an optical flow model. For example, the act 1130 can include generating, utilizing an optical flow model, an optical flow vector for the segmented area from the first image to the one or more subsequent images. In additional embodiments, the act 1130 includes applying the object mask of the segmented area to the first image to obtain a first segmented image, applying the object mask of the segmented area to the one or more subsequent images to obtain one or more subsequent segmented images, and generating a plurality of optical flow vectors indicating movement of corresponding pixels from the first segmented image to the one or more subsequent segmented images.

Additionally, the series of acts 1100 includes an act 1140 of determining an input command based on the optical flow vector. In some embodiments, the act 1140 includes analyzing the plurality of optical flow vectors combined into a vector map to determine the input command from a plurality of input commands. In additional embodiments, the act 1140 includes determining that the vector map indicates the input command based on the plurality of optical flow vectors of the vector map satisfying a minimum vector movement threshold.

As shown, the series of acts 1100 includes the act 1150 of executing the input command. In some embodiments, executing the input command can include providing the input command directly or indirectly to the virtual environment. In one or more embodiments, the act 1150 can also include presenting a virtual environment via a virtual reality device and presenting the hand within the virtual environment. In additional embodiments, the act 1150 can include presenting a virtual input device in connection with the hand within the virtual environment based on the pose of the hand.

Moreover, the series of acts 1100 can include additional acts. For example, in one or more embodiments, the series of acts 1100 can include detecting a threshold amount of movement in the segmented area based on the optical flow vector; determining, utilizing the machine-learning hand pose model, an updated pose of the hand within a second image based on detecting the threshold amount of movement; and detecting an updated segmented area in the second image and in a third image based on the updated pose of the hand. In additional embodiments, the series of acts 1100 can include determining the input command based on the optical flow vector by determining that the optical flow vector indicates a sudden termination of movement.

In various embodiments, the series of acts 1100 can include generating an environmental optical flow vector utilizing the optical flow model and modifying the optical flow vector for the segmented area based on the environmental optical flow vector. In some embodiments, the series of acts 1100 can include determining an anchor point on the hand and determining the optical flow vector for the segmented area relative to the anchor point on the hand.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
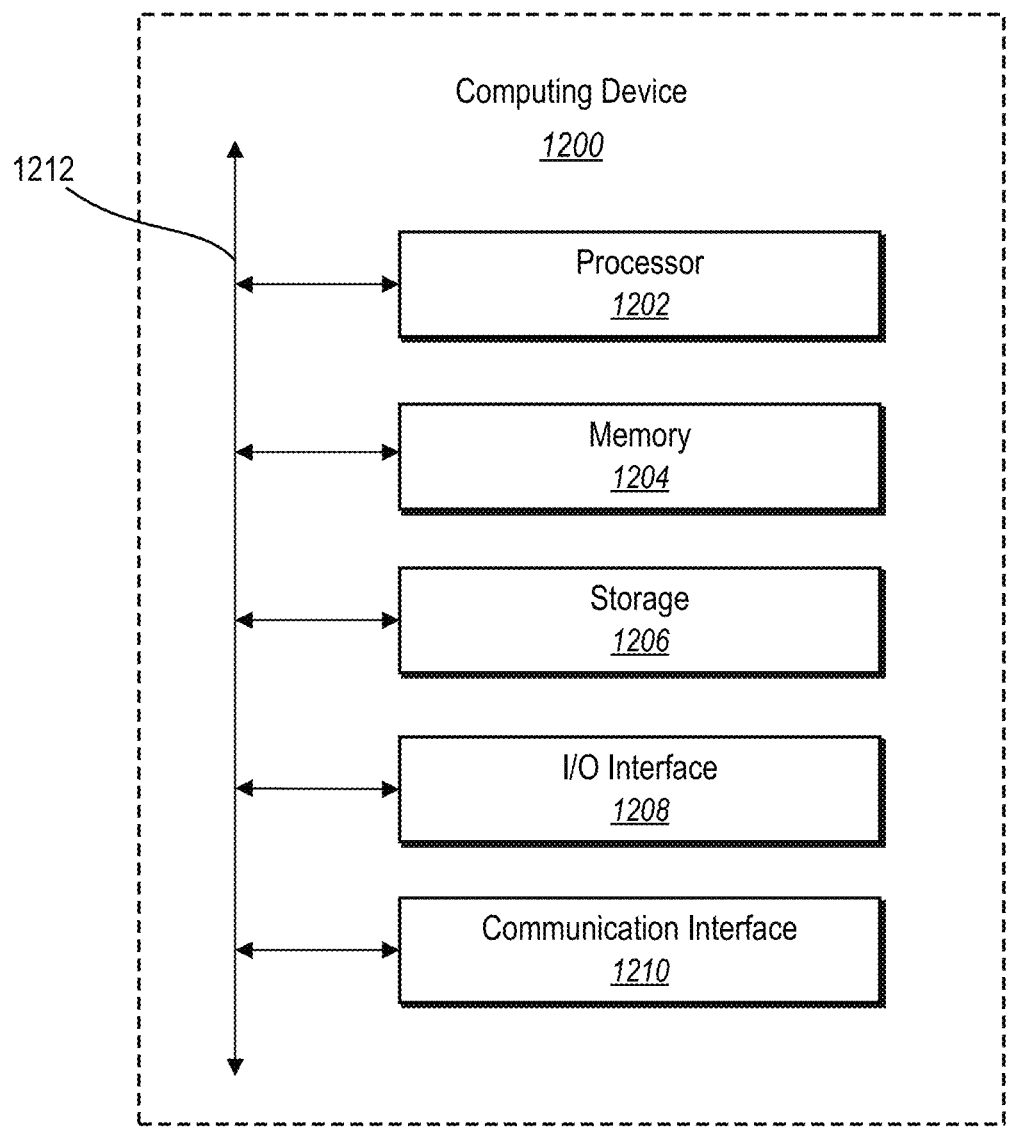
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that the computing device 1200 may implement the hybrid detection system 204. In various embodiments, the computing device 1200 can represent the virtual reality device 202, the server device 220, or the computing device 1000 described above.

As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. While an example computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. For example, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. For example, the processor 1202 may include one or more instruction caches, one or more data caches, and one or more translation lookaside buffers (TLBs). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The storage device 1206 includes storage for storing data or instructions. For example, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, another known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (e.g., packet-based communication) between the computing device 1200 and one or more other computing devices or networks. For example, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 1210 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that connects components of the computing device 1200 to each other. For example, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, utilizing a machine-learning hand pose model, a pose of a hand within a first image as a first hand pose from a plurality of hand poses;
   based on determining the pose of the hand as the first hand pose, utilizing the first hand pose to identify at least one segmented area to capture within a set of digital images;
   applying the at least one segmented area to the first image and one or more subsequent images;
   generating, utilizing an optical flow model, an optical flow vector for the at least one segmented area from the first image to the one or more subsequent images;
   determining an input command based on the optical flow vector; and
   executing the input command.

2. The method of claim 1, further comprising:
presenting, via a virtual reality device, a virtual environment; and
presenting the hand within the virtual environment.

3. The method of claim 2, further comprising presenting a virtual input device in connection with the hand within the virtual environment based on determining the pose of the hand as the first hand pose.

4. The method of claim 2, further comprising capturing, in real-time, the first image and the one or more subsequent images utilizing a camera that is associated with the virtual reality device.

5. The method of claim 1, wherein determining, utilizing the machine-learning hand pose model, the pose of the hand within the first image as the first hand pose comprises analyzing key points of the hand to identify the first hand pose from the plurality of hand poses.

6. The method of claim 1, further comprising identifying, based on identifying the at least one segmented area corresponding to the first hand pose, a portion of the first image and a corresponding portion of the one or more subsequent images that encompass a last finger joint of a finger of the hand.

7. The method of claim 1, wherein generating, utilizing the optical flow model, the optical flow vector for the at least one segmented area from the first image to the one or more subsequent images comprises generating an object mask corresponding to the at least one segmented area.

8. The method of claim 7, wherein generating, utilizing the optical flow model, the optical flow vector for the at least one segmented area from the first image to the one or more subsequent images comprises:
applying the object mask of the at least one segmented area to the first image to obtain a first segmented image;
applying the object mask of the at least one segmented area to the one or more subsequent images to obtain one or more subsequent segmented images; and
generating a plurality of optical flow vectors indicating movement of corresponding pixels from the first segmented image to the one or more subsequent segmented images.

9. The method of claim 8, wherein determining the input command based on the optical flow vector comprises analyzing the plurality of optical flow vectors combined into a vector map to determine the input command from a plurality of input commands.

10. The method of claim 9, further comprising determining that the vector map indicates the input command based on the plurality of optical flow vectors of the vector map satisfying a minimum vector movement threshold.

11. A non-transitory computer-readable medium storing instructions that, when executed by at least one processor, cause a virtual reality device to:
determine, utilizing a machine-learning hand pose model, a pose of a hand within a first image as a first hand pose from a plurality of hand poses;
based on determining the pose of the hand as the first hand pose, utilize the first hand pose to identify at least one segmented area to capture within a set of digital images;
apply the at least one segmented area to the first image and one or more subsequent images;
generate, utilizing an optical flow model, an optical flow vector for the at least one segmented area from the first image to the one or more subsequent images;
determine an input command based on the optical flow vector; and
execute the input command.

12. The non-transitory computer-readable medium of claim 11, further comprising instructions, when executed by the at least one processor, cause the virtual reality device to:
detect a threshold amount of movement in the at least one segmented area based on the optical flow vector;
based on detecting the threshold amount of movement, determine, utilizing the machine-learning hand pose model, an updated pose of the hand within a second image as a second hand pose from the plurality of hand poses;
based on determining the updated pose of the hand as the second hand pose, identify at least one updated segmented area to capture within a set of digital images; and
apply the at least one updated segmented area to the second image and a third image.

13. The non-transitory computer-readable medium of claim 12, wherein the instructions, when executed by the at least one processor, cause the virtual reality device to determine the input command based on the optical flow vector by determining that the optical flow vector indicates a sudden termination of movement.

14. The non-transitory computer-readable medium of claim 12, further comprising instructions that, when executed by the at least one processor, cause the virtual reality device to:
generate, utilizing the optical flow model, an environmental optical flow vector; and
modify the optical flow vector for the at least one segmented area based on the environmental optical flow vector.

15. The non-transitory computer-readable medium of claim 11, further comprising instructions that, when executed by the at least one processor, cause the virtual reality device to:
determine an anchor point on the hand; and
determine the optical flow vector for the at least one segmented area relative to the anchor point on the hand.

16. A virtual reality system comprising:
at least one head-mounted display;
one or more cameras;
at least one processor that causes the virtual reality system to:
capture, utilizing the one or more cameras, a first image and one or more subsequent images;
determine, utilizing a machine-learning hand pose model, a pose of a hand within the first image as a first hand pose from a plurality of hand poses;
based on determining the pose of the hand as the first hand pose, utilize the first hand pose to identify at least one segmented area to capture within a set of digital images;
apply the at least one segmented area to the first image and the one or more subsequent images;
generate, utilizing an optical flow model, an optical flow vector for the at least one segmented area from the first image to the one or more subsequent images;
determine an input command based on the optical flow vector; and
execute the input command.

17. The system of claim 16, wherein the at least one processor causes the virtual reality system to generate, utilizing the optical flow model, the optical flow vector for the at least one segmented area from the first image to the one or more subsequent images by generating an object mask corresponding to the at least one segmented area.

18. The system of claim 17, wherein the at least one processor causes the virtual reality system to generate, utilizing the optical flow model, the optical flow vector for the at least one segmented area from the first image to the one or more subsequent images by:
   applying the object mask of the at least one segmented area to the first image to obtain a first segmented image;
   applying the object mask of the at least one segmented area to the one or more subsequent images to obtain one or more subsequent segmented images; and
   generating a plurality of optical flow vectors indicating movement of corresponding pixels from the first segmented image to the one or more subsequent segmented images.

19. The system of claim 18, wherein the at least one processor causes the virtual reality system to determine the input command based on the optical flow vector by analyzing the plurality of optical flow vectors combined into a vector map to determine the input command from a plurality of input commands.

20. The system of claim 19, wherein the at least one processor causes the virtual reality system to determine that the vector map indicates the input command based on the plurality of optical flow vectors of the vector map satisfying a minimum vector movement threshold.

* * * * *